(12) United States Patent
Borgharkar et al.

(10) Patent No.: US 7,482,036 B2
(45) Date of Patent: Jan. 27, 2009

(54) LENS COATING CURING METHODS

(75) Inventors: Narendra Borgharkar, Seminole, FL (US); Cindy Burnshire, St. Petersburg, FL (US); Sheila Tatman, Seminole, FL (US); Hoa Thien Dang, Tampa, FL (US); Sidney White, Seminole, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 920 days.

(21) Appl. No.: 10/844,702

(22) Filed: May 13, 2004

(65) Prior Publication Data

US 2005/0008774 A1 Jan. 13, 2005

Related U.S. Application Data

(60) Provisional application No. 60/470,082, filed on May 13, 2003.

(51) Int. Cl.
*B05D 5/06* (2006.01)

(52) U.S. Cl. .................... 427/162; 427/163.1; 427/165; 427/166; 427/167; 427/169; 118/500

(58) Field of Classification Search ................. 427/162, 427/163.1, 165, 166, 167, 169; 118/500
See application file for complete search history.

(56) References Cited

U.S. PATENT DOCUMENTS

| | | | | |
|---|---|---|---|---|
| 3,492,268 A | * | 1/1970 | Baker | 525/462 |
| 4,919,850 A | * | 4/1990 | Blum et al. | 264/1.38 |
| 5,201,927 A | * | 4/1993 | Nakamura et al. | 65/64 |
| 5,693,366 A | * | 12/1997 | Mase et al. | 427/164 |
| 5,753,301 A | | 5/1998 | Brytsche et al. | 427/162 |
| 6,051,310 A | | 4/2000 | Cano et al. | 428/336 |
| 6,218,494 B1 | | 4/2001 | White, Jr. et al. | 528/15 |
| 6,455,103 B1 | * | 9/2002 | Mennig et al. | 427/165 |
| 7,044,429 B1 | * | 5/2006 | Foreman et al. | 249/205 |
| 2004/0156983 A1 | * | 8/2004 | Moravec et al. | 427/162 |

* cited by examiner

*Primary Examiner*—Alain L Bashore
(74) *Attorney, Agent, or Firm*—Fulbright & Jaworski L.L.P.

(57) ABSTRACT

A method that includes providing a lens having a first side, a second side, and an anti-reflective or mirror coating on the first side; depositing a heat-curable coating on the second side of the lens; and heating the heat-curable coating without damaging the anti-reflective or mirror coating. Another method that includes providing a non-pure polycarbonate lens having a first side, a second side, and a first coating on the first side; depositing a heat-curable coating on the second side of the lens; and heating the heat-curable coating without damaging the first coating. Other methods are also disclosed.

40 Claims, 12 Drawing Sheets

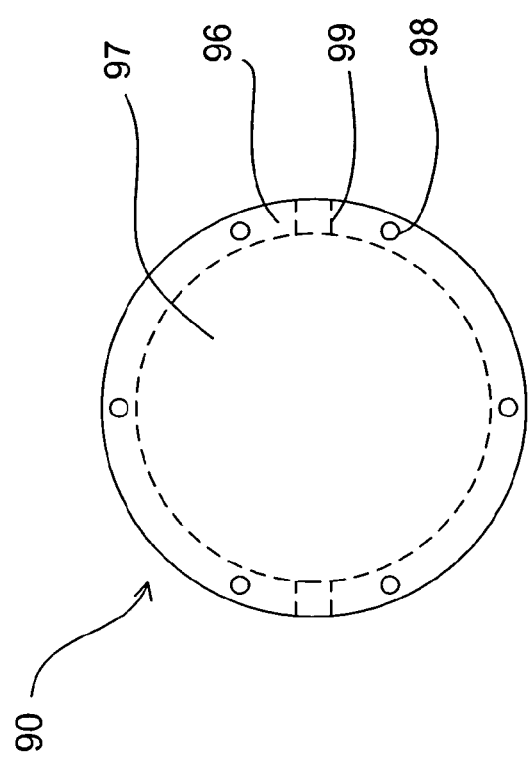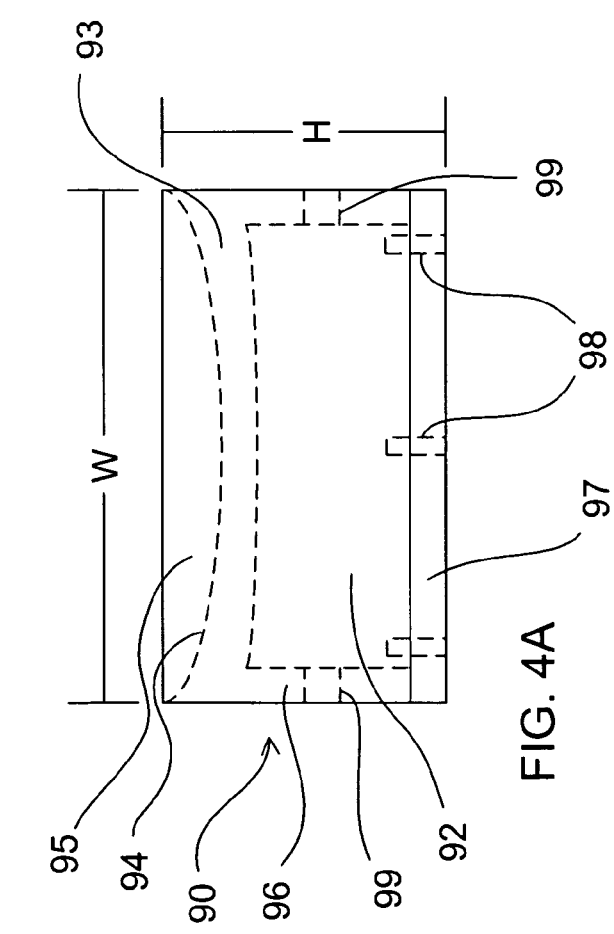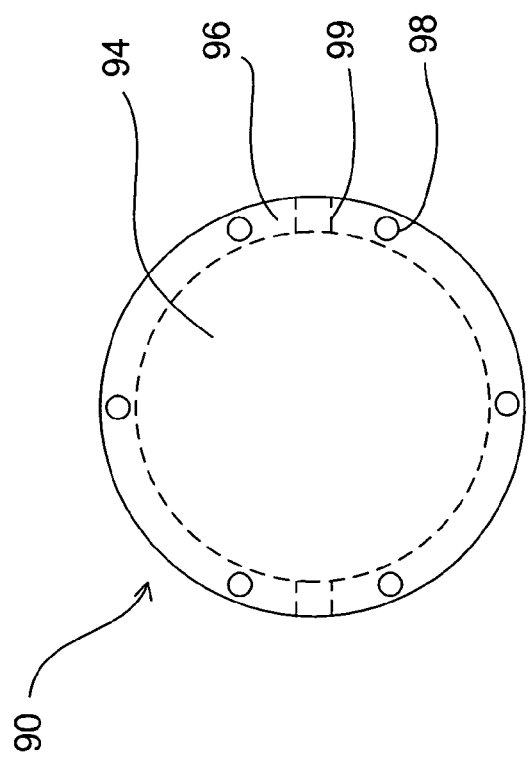

LENS COATING CURING METHODS

CROSS-REFERENCE(S) TO RELATED APPLICATION(S)

This application claims priority to U.S. Provisional Patent Application Ser. No. 60/470,082, filed May 13, 2003, the entire contents of which are expressly incorporated by reference.

BACKGROUND OF THE INVENTION

1. Field of the Invention

The invention relates to methods of curing coatings on lenses. More specifically, the invention relates to methods of curing one or more coatings on one side of a lens without damaging an existing coating or coatings on another side of the lens.

2. Description of Related Art

Lenses suited for use in eyeglasses, such as ophthalmic lens, typically have one or more coatings on either or both sides of the lenses. Such coatings include hard coatings, which give the side of the lens to which they are applied abrasion-resistant properties; anti-reflective coatings, which help eliminate reflections and, consequentially, reduce the fatigue and/or stress users may experience while driving at night or working in front of a computer; and mirror coatings, which give the lens a shiny, mirror-like look and tend to reflect harsh light rays emitted from surfaces such as snow and water. These coatings may be applied to a lens at different times during the manufacturing process.

In some cases, the laboratory of the business where a customer goes to have his eyeglass prescription filled will apply one or more of the coatings to the lens. In some of these cases, the lens will already have one or more coatings applied to its front, or convex side, when it is shipped to the laboratory/business. Specifically, the lens may have a hard coating, an anti-reflective coating, or both coatings on its front side. As another example, the lens may have a hard coating, a mirror coating, or both coatings on its front side.

Depending on the customer's preference, the laboratory may then apply a hard coating, an anti-reflective coating, or both, to the back, or concave, side of the lens. The laboratory may also apply a hard coating, an anti-reflective coating, or both, to the front side of the lens if no such coating(s) exists or if one or more such coatings are needed. The same is true for a hard coating and a mirror coating (as opposed to an anti-reflective coating). Prior to applying coatings to a lens, a laboratory will typically surface the lens to the appropriate prescription power, according to the customer's needs.

The coatings that may be applied to either or both sides of a lens may be UV-curable. "UV-curable" means curable through the application of ultra violet rays to the coating. The coatings that may be applied to either or both sides of the lens may alternatively be heat-curable.

Different coatings respond differently to heat. Hard coatings tend to be damaged through cracks or cracking if heated too much. Both anti-reflective and mirror coatings are more sensitive to heat than hard coatings. Anti-reflective and mirror coatings also tend to crack if heated too much. Typically, however, damage to anti-reflective and mirror coatings is described as crazing, which means becoming covered with fine cracks. Anti-reflective and mirror coatings tend to craze when heated too much because they do not possess a good ability to expand under the influence of heat. A hard coating is typically at least 20 to 50 times thicker than either anti-reflective or mirror coatings.

It is known to apply a UV-curable hard coating to the back side of a lens, and to cure that UV-curable hard coating without damaging a hard coating, an anti-reflective coating, or both, that exist on the front side of the lens.

It is also known to cure a thermally-curable hard coating on the back side of a lens using a thermal curing fluid from 3M, without damaging a hard coating on the front side of the lens. The lens was dipped into the thermal curing fluid, which had a temperature of around 132° C. The lens was made of polycarbonate (i.e., it was a polycarbonate lens as that term is defined below), and the front side hard coating was mostly acrylic or soft organosilicone. The front side did not have an anti-reflective or mirror coating.

It is also known to bake a lens having a thermally-curable hard coating deposited on a UV-curable primer on the back side of the lens without damaging a hard coating that existed on the front side of the lens. The lens was made of polycarbonate. The front side did not have an anti-reflective or mirror coating.

SUMMARY OF THE INVENTION

We provide methods and devices that may be used to cure one or more coatings on one side of certain lenses without damaging one or more coatings on the other side of those lenses. For example, one of our methods involves providing a lens having an anti-reflective or mirror coating on a first side of the lens; depositing a heat-curable coating on a second side of the lens; and heating the heat-curable coating without damaging the anti-reflective or mirror coating.

Another of our methods involves providing a non-pure polycarbonate lens having a first coating on a first side of the lens; depositing a heat-curable coating on a second side of the lens; and heating the heat-curable coating without damaging the first coating.

Another of our methods involves providing a lens having a first coating on a first side of the lens; depositing a heat-curable coating on a second side of the lens; heat curing the heat-curable hard coating; and cooling the lens so that the first coating is not damaged by the heat curing.

Still another of our methods is a method of curing one or more coatings on a lens, and the method includes heating the lens for a period of time; and cooling the lens for a portion of the period of time.

Additional methods are described below.

BRIEF DESCRIPTION OF THE DRAWINGS

The following drawings demonstrate certain, but not necessarily all, aspects of the present methods. The drawings illustrate by way of example and not limitation, and they use like references to indicate similar elements.

FIGS. 4A-4C shows different views of a lens holding device that may be used in carrying out embodiments of the present methods.

DESCRIPTION OF ILLUSTRATIVE EMBODIMENTS

In this document (including the claims), the terms "comprise" (and any form of comprise, such as "comprises" and "comprising"), "have" (and any form of have, such as "has" and "having"), and "include" (and any form of include, such as "includes" and "including") are open-ended linking verbs. As a result, a method, or a step in a method, that "comprises," "has," or "includes" one or more steps or elements possesses those one or more steps or elements, but is not limited to possessing only those one or more steps or elements.

Thus, and by way of example, a method "comprising" providing a lens having a first side, a second side, and an anti-reflective or mirror coating on the first side; depositing a heat-curable coating on the second side of the lens; and heating the heat-curable coating without damaging the anti-reflective or mirror coating, has, but is not limited to only having, the recited steps. That is, the method possesses the recited steps, but also covers other steps that are not expressly recited. For example, the method also covers depositing another coating—in addition to the heat-curable coating—on the second side of the lens, such as on the heat-curable coating or between the second side and the heat-curable coating.

Furthermore, individual steps of a method are to be interpreted the same way. That is, a step that calls for "depositing a heat-curable coating on the second side" of a lens means depositing at least a heat-curable coating on the second side of the lens. Thus, provided a heat curable coating is deposited on the second side of the lens, this step also covers depositing additional coatings on the second side of the lens.

Figure 1:
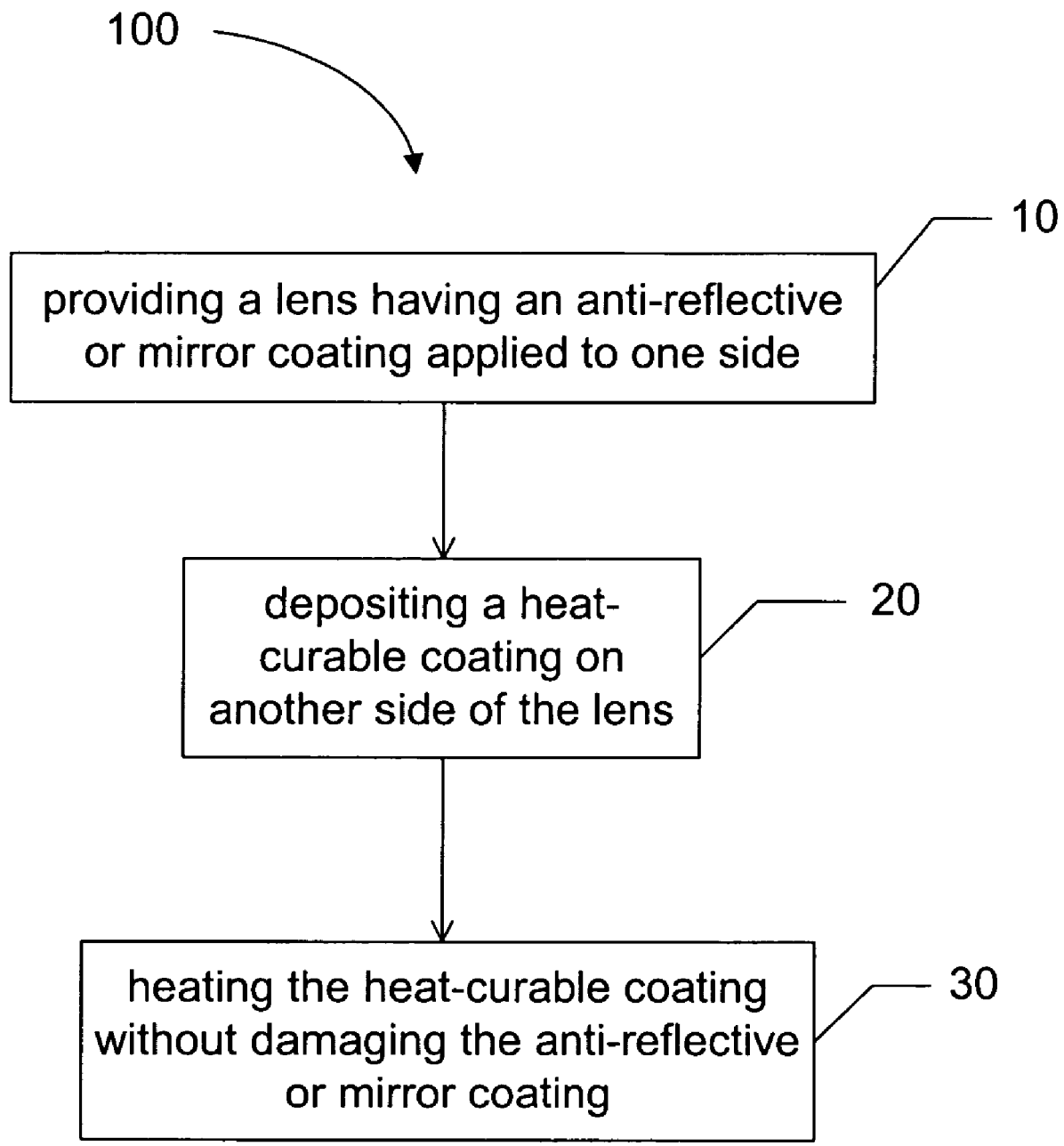
FIG. 1 is a flow chart listing steps of one embodiment of the present methods.

FIG. 1 shows one embodiment of the present methods. Method 100 includes step 10, which is providing a lens, such as an ophthalmic lens, that has an anti-reflective or mirror coating on one side of the lens, such as a convex side; step 20, which is depositing a heat-curable coating on another side of the lens, such as a concave side; and step 30, which is heating the heat-curable coating without damaging the anti-reflective or mirror coating.

Damage means cracking or crazing noticeable to the naked eye. Thus, heat curing a heat-curable coating without "damaging" another coating means that the other coating is not cracked or crazed (as perceived by the naked eye) due to the heat curing.

A coating that is "on" a side of a lens is defined as a coating that (a) is positioned over that side, (b) need not be in contact with that side—i.e., one or more intervening coatings may be disposed between that side and the coating in question, and (c) need not cover that side completely.

A coating that has been deposited "on" a side of lens is defined as a coating that (a) is positioned over that side using any means of depositing (such as spin coating, dip coating, or vacuum deposition), (b) need not be in contact with that side—i.e., one or more intervening coatings may be disposed between that side and the coating in question, and (c) need not cover that side completely.

"Heating" a lens is defined as raising the temperature of the lens through the application of heat. "Heating" can, but need not, result in the complete curing of the coating or coatings on the lens that are being heated. One form of "heating" is "heat curing," which is defined below. "Heating" does not include acts that are not designed to play a role in the imparting of coatings on the lens.

"Heat curing" a coating is defined as curing, though not necessarily completely curing, the coating using any suitable means of applying heat to the coating. The heat may be generated, for example, by an infrared heater, heating coils, or any other thermal heater, and applied, for example, through the use of forced air or simply proximity (e.g., the heat reaches the coating by virtue of the source of the heat being close to the coating). "Heat curing" can include pre-curing, as that term is used by those of skill in the art; post-curing, as that term is used by those of skill in the art; or both pre- and post-curing.

A "heat-curable" coating is defined as a coating that is curable through the application of heat rather than ultra-violet light/radiation. Thus, ultra violet-curable coatings are not heat-curable coatings within the meaning of this document.

Figure 2:
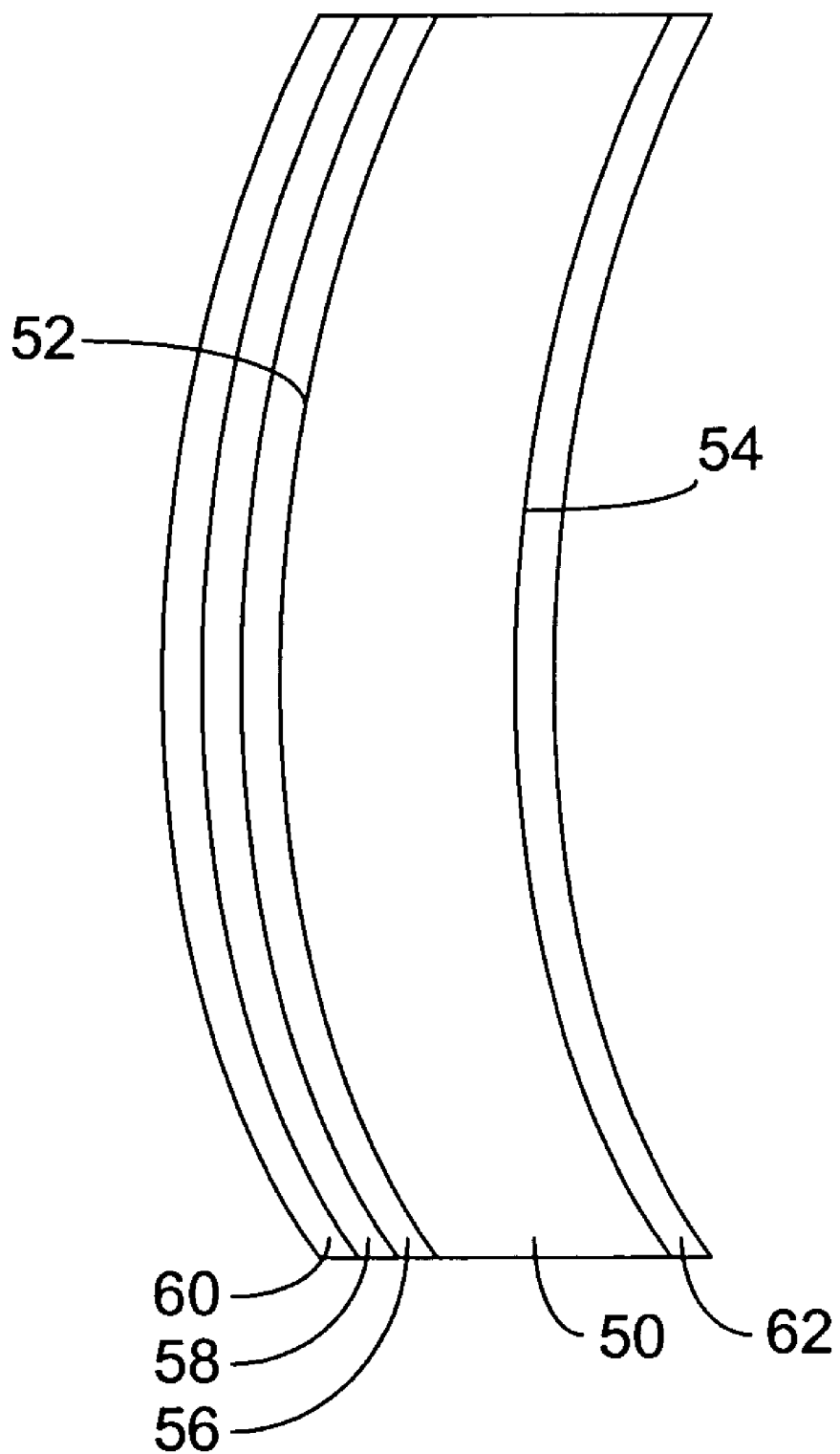
FIG. 2 depicts one version of a lens that may be used consistently with the present methods.

An example of a lens to which a heat-curable coating may be applied and cured in the manner of method 100 is shown in FIG. 2. Lens 50 includes first side 52 and second side 54. In the embodiment shown in FIG. 2, first side 52 is convex and second side 54 is concave. First side 52 has a coating on it. More specifically, first side 52 has a number of coatings, or layers, on it—coatings 56, 58, and 60. Coating 56 may be a primer coating made of latex. Coating 58 may be a hard coating made of one or more layers of material (e.g., 2, 3, 4, 5, or more layers) that combine to provide abrasion-resistant properties. Coating 60 may be an anti-reflective or mirror coating made of one or more layers of material (e.g., 2, 3, 4, 5, or more layers) that combine to provide anti-reflective or mirror properties. Those skilled in the art may use the term "stack" to describe a coating, such as coating 60, made of 2 or more layers. In addition, those skilled in the art may use the term "stack" to refer to multiple coatings, such as coatings 56 and 58.

Coating 56

The primer used for coating 56 may be an impact-resistant primer. By "impact-resistant primer" we mean a primer coating that improves the impact resistance of the finished optical article as compared with the same optical article without the impact-resistant primer coating. Typical impact-resistance primer coatings are (meth)acrylic based coatings and polyurethane based coatings.

(Meth)acrylic based impact-resistant coatings are, among others, disclosed in U.S. Pat. No. 5,015,523, whereas thermoplastic and crosslinked based polyurethane resin coatings are disclosed, inter alia, in Japanese Patents 63-141001 and 63-87223, EP-0404111 and U.S. Pat. No. 5,316,791.

In particular, a suitable impact-resistant primer coating for use as coating 56 may be made from a latex composition such as a poly(meth)acrylic latex, a polyurethane latex or a polyester latex. Among the preferred (meth)acrylic based impact-resistant primer coating compositions there are polyethyleneglycol(meth)acrylate based compositions such as, for example, tetraethyleneglycoldiacrylate, polyethyleneglycol (200) diacrylate, polyethyleneglycol (400) diacrylate, polyethyleneglycol (600) di(meth)acrylate, as well as urethane (meth)acrylates and mixtures thereof.

Preferably, an impact-resistant primer coating for use as coating 56 has a glass transition temperature (Tg) of less than 30° C.

Among the preferred impact-resistant primer coating compositions for use as coating 56, there is an acrylic latex commercialized under the name Acrylic latex A-639 commercialized by Zeneca and a polyurethane latex commercialized under the names W-240 and W-234 by Baxenden.

Generally, the thickness of coating 56 falls within the range of 0.1-10 μm, and preferably 0.5-2 μm. For example, coating 56 may be around 1 μm thick.

Coating 58

Preferably, the hard coatings used with the present methods comprise hydrolyzates of polyalkoxysilanes, especially those comprising epoxytrialkoxysilanes and/or epoxydialkoxysilanes. Those may optionally and preferably comprise inorganic fillers such as $SiO_2$, $TiO_2$, $Sb_2O_5$, $Al_2O_3$, and $Fe_2O_3$.

One example of an abrasion resistant coating that may be used for coating 58 is obtained by curing a composition containing:

A: colloidal silica which has a mean particle diameter of 1 to 100 μm;

B: a solvent;

C: a hydrolysate or a mixture of hydrolysates of silane compound(s); of formula:

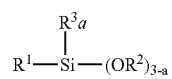 (α)

in which:

$R^1$ denotes an organic group containing an epoxy group;

$R^2$ is a hydrocarbon radical that has 1 or 2 carbon atoms;

$R^3$ is a hydrocarbon group that has from 1 to 4 carbon atoms, and a is 0 or 1 in value.

The structure of the silica is preferably $SiO_2$. The colloidal silica is obtained by macromolecular dispersion of anhydrous silica in a dispersing medium. This dispersing medium may be water, an alcohol, a cellosolve, a ketone, an ester, a carbitol or the like, or mixtures thereof.

The silane compounds that are more particularly preferred contain an epoxy group of formula:

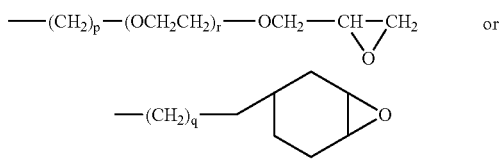

where p and q are 1 to 6 and r is 0 to 2.

Examples of suitable hydrolyzed silane compounds for use with the present methods include:

γ-glycidoxypropyltrimethoxysilane,
γ-glycidoxypropyltriethoxysilane,
γ-glycidoxypropyl(methyl)dimethoxysilane,
γ-glycidoxypropyl(methyl)diethoxysilane,
β-(3,4-epoxycyclohexyl)ethyltrimethoxysilane, or the like.

Suitable abrasion-resistant coatings that may be used for coating 58 preferably contain additives for prolonging the storage life, such as β-diketone and β-ketoester chelating agents, or mixtures thereof. Other examples include acetylacetone, ethyl acetoacetate and the like.

The hydrolysates of silane compounds of formula (α) are obtained by hydrolysis in the dispersing medium for the colloidal silica. The hydrolysis may be performed by adding water and an acid catalyst such as hydrochloric, sulfuric, nitric, phosphoric or acetic acid.

Crosslinking catalysts may be introduced into these compositions to reduce the cure temperature and period. Suitable such catalysts include Bronsted acids such as hydrochloric acid, sulfuric acid and nitric acid, Lewis acids such as aluminum chloride, tin chloride, zinc borofluoride, boron fluoride, acid halide compounds, chelated acetylacetone and acetoacetate compounds, carboxylic compounds of magnesium, titanium, zirconium and tin, and sodium, magnesium, copper, zinc, hydrogen and lithium perchlorates.

The hard coating compositions that may be used for coating 58 may additionally contain additives such as ultraviolet-absorbers, silicone or fluorinated surfactants, dyes, pigments and refractive index modifiers.

Suitable methods of applying a suitable abrasion-resistant coating 58 onto primer coating 56 include centrifuging, dipping, and spraying. These same application methods may be used to apply a suitable primer coating 56 as well.

The curing of the abrasion-resistant layer is preferably carried out at a temperature of 80 to 150° C. for 30 minutes to 2 h 30 min. After curing, the thickness of the abrasion-resistant layer is preferably chosen to be between 1 and 15 μm, and more particularly between 2 and 6 μm.

Another suitable abrasion-resistant coating that may be used for coating 58 (referred to in this document as "HC 1") may be made from 80.5 parts of 0.1N hydrochloric acid added dropwise to a solution containing 224 parts of (3-glycidyloxypropyl)-trimethoxysilane (GLYMO) and 120 parts of dimethyldiethoxysilane (DMDES). The hydrolysed solution may be stirred for 24 hours at room temperature and then 718 parts of 30% colloidal silica in methanol, 15 parts of aluminum acetylacetonate and 44 parts of ethylcellosolve may be added. A small amount of surfactant may be added. The theoretical dry extract (TDC) of such a composition should be in the order of 13% of solid material from the hydrolysed DMDES.

Another suitable hard coating composition is described in U.S. Pat. No. 4,211,823.

Coating 60

Anti-reflective

One example (referred to in this document as "AR coating 1") of a multi-layer anti-reflective coating that may be used for coating 60 and applied to coating 58 by vacuum deposition composed of the following layers in the order listed at the optical thicknesses listed:

| Material | Optical thickness |
|---|---|
| $ZrO_2$ | 55 nm |
| $SiO_2$ | 30 nm |
| $ZrO_2$ | 160 nm |
| $SiO_2$ | 120 nm |

The optical thickness are give for λ=550 nm. The optical thickness of a layer is the physical thickness of the layer multiplied by the refractive index of the layer at 550 nm.

Examples of other anti-reflective coatings suitable for use as coating 60 consist of a mono- or multilayer film of dielectric material such as SiO, $SiO_2$, $Si_3N_4$, $TiO_2$, $ZrO_2$, $Al_2O_3$, $MgF_2$ or $Ta_2O_5$, or mixtures thereof. The use of such materials makes it possible to prevent the appearance of a reflection at the lens-air interface.

An anti-reflective coating 60 may be applied by vacuum deposition according to one of the following techniques:

1: by evaporation, optionally ion beam-assisted.

2: by spraying using an ion beam.

3: by cathodic sputtering.

4: by plasma-assisted vapor-phase chemical deposition.

Besides vacuum deposition, deposition of an inorganic layer for an anti-reflective version of coating 60 by a sol gel route (for example from tetraethoxysilane hydrolysates) may be done.

In the case where an anti-reflective version of coating 60 includes a single layer, its optical thickness should be equal to $\lambda/4$, where $\lambda$ is a wavelength of between 450 and 650 nm. In the case where coating 60 includes three layers, a combination may be employed corresponding to optical thicknesses $\lambda/4$-$\lambda/2$-$\lambda/4$ or $\lambda/4$-$\lambda/4$-$\lambda.4$, respectively. It is additionally possible to employ an equivalent coating 60 made up of more layers, instead of any one of the layers forming part of the above-mentioned three layers.

Mirror

Mirror coatings that may be used as coating 60 may be made using a high-index layer followed by a low-index layer followed by a high-index layer. Adding more layer pairs—e.g., high- and low-index—will increase the reflectance of the coating. Stacks that may be used as mirror coating versions of coating 60 may be designed by the ¼ wave method, as will be understood by those of skill in the art. Those of skill in the art will also understand that different mirror coating colors may be obtained by varying the thicknesses of the layers of the coating in relation to the refractive indices of those layers.

Mirror coatings that may be used as coating 60 may be deposited on a side of lens using any suitable method known in the art, such as vacuum deposition, sputtering, evaporation coating, and spin coating.

Mirror coatings may comprise one or more layers of dielectric oxides, such as SiO, $SiO_2$, $ZrO_2$, $TiO_2$, or the like. A 2-layer broadband mirror coating with a 20% reflect over the wavelength range of 380-780 nm may be made with the following stack:

| Material | Physical thickness |
| --- | --- |
| $TiO_2$ | 47 nm |
| $SiO_2$ | 17 nm |

In another embodiment, a 3-layer broadband mirror coating with a reflect of 20% over the wavelength range of 380-780 nm may be made with the following stack:

| Material | Physical thickness |
| --- | --- |
| $TiO_2$ | 12 nm |
| $SiO_2$ | 30 nm |
| $TiO_2$ | 60 nm |

It is possible to make dielectric mirror coatings using multiple combinations of the stacks described above, or using combinations of high- and low-index layers of other of the oxides described above.

Adhesion Tests

Each of the present coatings may be subjected to one or more adhesion tests to determine whether the coating is properly adhered to its substrate. For example, dry adhesion of a coating may be measured by cutting through the coating with a razor a series of 10 lines, spaced 1 mm apart, followed by a second series of 10 lines, spaced 1 mm apart, at right angles to the first series, forming a crosshatch pattern. After blowing off the crosshatch pattern with an air stream to remove any dust formed during scribing, clear cellophane tape may be applied over the crosshatch pattern, pressed down firmly, and then rapidly pulled away from coating in a direction perpendicular to the coating surface. Application and removal of fresh tape may be repeated two additional times. The lens may then be submitted to tinting to determine the percentage adhesion, with tinted areas signifying adhesion failures.

A boiling test that comprises immersing a coated lens in boiling water for 30 minutes may also be used to test adhesion.

A coating passes these adhesion tests when the percentage adhesion is more than 95%.

Lens 50

Lens 50 may be a polycarbonate lens. By "polycarbonate" lens, we mean a lens made from bisphenol-A polycarbonate. Such material may be obtained from a variety of sources, including General Electric (e.g., LEXAN), Bayer AG (e.g., MAKROLON), and Teijin Limited.

Lens 50 may also be a non-pure polycarbonate lens. This means that the lens is made from any suitable material or combination of suitable materials except pure polycarbonate. In other words, the lens must include some suitable material other than polycarbonate. A non-pure polycarbonate lens need not include any polycarbonate, but can include polycarbonate, provided the lens also includes other suitable material. An example of such a lens is Essilor International's ORMA brand lens, which contains diethylene glycol bis(allyl carbonate).

Instead of the combination of coatings 56, 58 and 60, other combinations of coatings may be applied to the convex side of a lens consistent with the present methods. For example, a hard coating and an anti-reflective coating may be applied to first side 52 without a primer coating. A hard coating and a mirror coating may be applied in the same way. Alternatively, a primer coating may be used in conjunction with a hard coating (e.g., 56 and 58), with no anti-reflective or mirror coating on first side 52. As another alternative, only a hard coating (with or without a primer coating) may be applied to first side 52. As yet another alternative, only an anti-reflective coating (with or without a primer coating) may be applied to first side 52. As still another alternative, only a mirror coating (with or without a primer coating) may be applied to first side 52. The primer coatings, hard (e.g., abrasion-resistant) coatings, and anti-reflective or mirror coatings described above may be used in these alternative combinations.

Consistent with step 20 of method 100, coating 62—which is a heat-curable coating—may be deposited on second side 54 of lens 50 using any suitable method from those given above. For example, spin coating may be used to deposit, or apply, coating 62 to second side 54 of lens 50. Examples of a heat-curable coating include the hard coatings identified above for use as coating 58. Another example of a heat-curable hard coating is a sol-gel anti-reflective coating. The anti-reflective coatings suited as sol-gel coatings generally and preferably contain a high amount of inorganic oxides, such as metal oxides, embedded in a polysiloxane matrix (preferably obtained from hydrolysis of alkoxysilanes). Generally they comprise more than 50 wt. % metal oxide, preferably more than 60% and even more preferably more than 70% (by weight of the cured coating). By contrast, preferred hard coatings generally contain lower amounts of inorganic oxides (however, up to 65% by weight of oxide is possible). They preferably are based on an organic matrix in general comprising an organopolysiloxane (obtained from hydrolysis of an organic alkoxysilane), such as GLYMO. Another example of a heat-curable hard coating is a sol gel mirror coating. One example of a sol-gel mirror coating is:

| Layer | Index | Physical thickness |
|---|---|---|
| 1 | 1.75 | 98 nm |
| 2 | 1.43 | 120 nm |
| 3 | 1.75 | 98 nm |

Additional coatings may be applied to second side 54 of lens 50 by, for example, depositing them on heat-curable coating 62. If heat-curable coating 62 is a hard coating, examples of such an additional coating include those anti-reflective and mirror coatings described above for use as coating 60. If heat curable coating 62 is a sol-gel anti-reflective coating, examples of such an additional coating include those hard coatings described above for use as coating 58. Other coatings that may be applied to second side 54 of lens 50 consistent with the present methods include one or more primer coatings, such as those given above for use as coating 56.

A coating that has been deposited "on" another coating ("coating 1" for the purpose of this definition) is defined as a coating that (a) is positioned over coating 1 using any means of depositing (such as spin coating, dip coating, or vacuum deposition), (b) need not be in contact with coating 1—i.e., one ore more intervening coatings may be disposed between coating 1 and the coating in question, and (c) need not cover coating 1 completely.

Figure 3:
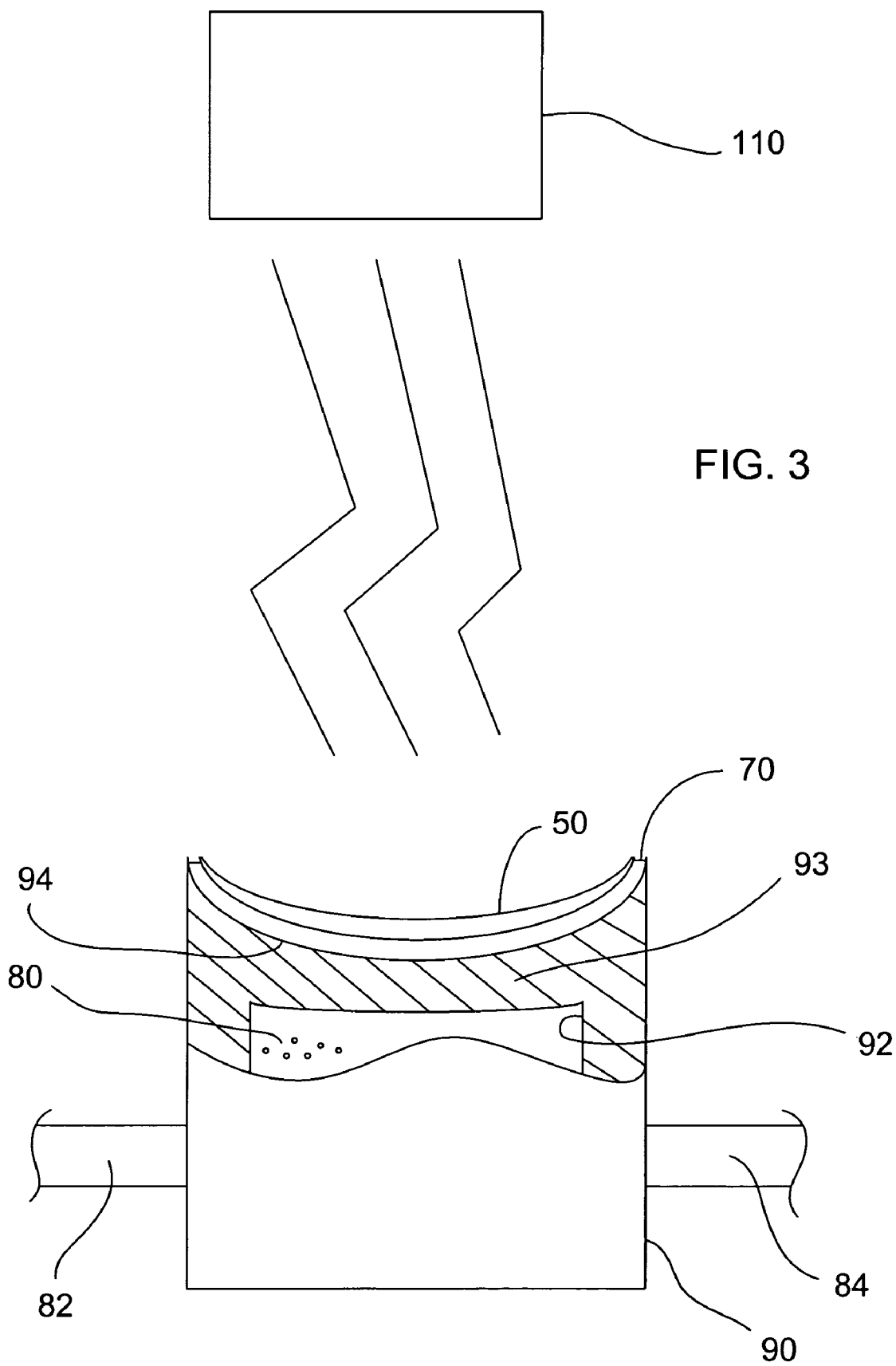
FIG. 3 shows a setup that may be used to carry out one or more steps of the present methods.

FIG. 3 shows a setup that may be used to carry out step 30 of method 100. FIG. 3 shows lens holding device 90, which has cavity 92 and a lens holding area defined by curved lens holding surface 94. FIG. 3 depicts lens holding device 90 in a partially sectional view to reveal an exemplary curvature of curved lens holding surface 94 and the top of cavity 92. Lens 50 sits in the lens holding area on top of thin water film 70, which is one form of a layer of liquid. Water 80 is continuously pumped into cavity 92 through inlet 82. Water is withdrawn from cavity 92 through outlet 84. Although not shown, inlet 82 and outlet 84 may be connected to a heat exchanger (such as a chilling unit) that recycles the water running through cavity 92. The water goes into the cavity through inlet 82 in a chilled state, and to the extent that the water exiting the cavity through outlet 84 has heated up, the heat exchanger through which it next travels as it is being recirculated cools it down again. For the sake of clarity, the coatings applied to the sides of lens 50 are not shown. Heater 110 is positioned above lens holding device 90 and, consequently, lens 50. One example of a heater that may be used is a hot air gun (e.g., a convection heater). Another example is an infrared heater, such as a DIMA SMRO-0252 heater.

Using the setup shown in FIG. 3, in order to heat cure the heat-curable coating deposited on the concave side of lens 50, heater 110 may be positioned 6 inches from the heat-curable hard coating and used to heat the heat-curable hard coating to a temperature of 110° Celsius for 18 minutes. This temperature, which is the temperature on the lens surface, may be measured using an infrared probe. Thus, the heat curing takes no more than one hour and, more specifically, no more than 30 minutes. As the heat curing occurs, water cooled to 14° Celsius is pumped through cavity 92 at a rate of 4 liters per minute. By doing this, the surface temperature of the convex side of lens 50 may kept below about 45° Celsius during the heat curing, and no cracking or crazing of the anti-reflective coating on the convex side results.

This same approach may be taken to heat cure any number of coatings on side 54 of lens 50, including heat-curable hard coatings, heat-curable anti-reflective coatings, heat-curable mirror coatings, and the like, without damaging the anti-reflective or mirror coating on the convex side of lens 50. This is true regardless of whether lens 50 includes polycarbonate material. Moreover, this approach will not result in damage to any other coatings on the convex side of lens 50 (such as hard coating 58 and/or primer coating 56) because the anti-reflective or mirror coating is the coating among those described above most susceptible to damage as a result of the heat curing. The cooling provided by water-cooled lens holding device 90 is conductive cooling because thin water film 70 transfers heat from the convex side of lens 50 to upper portion 93 of lens holding device 90, through upper portion 93 and to water 80, which is continuously moving into and out of cavity 92. The heat curing provided by heater 110 is convective heat curing.

A more detailed depiction of a suitable lens holding device for use in carrying out the present methods is shown FIGS. 4A-4C. FIG. 4A shows a side view of one embodiment of lens holding device 90, which may be water-cooled as described above. The embodiment of lens holding device 90 shown includes upper portion 93; curved lens holding surface 94, which defines lens holding area 95; side wall 96; cavity 92; and bottom 97. Bottom 97 may be an integral portion of lens holding device 90, or it may be bolted or screwed to side wall 96 with fasteners placed through holes 98. Openings 99 in side wall 96 are provided to communicate with inlet 82 and outlet 84 shown in FIG. 3. Width W of the embodiment of lens holding device 90 shown in FIG. 4A may be 3.125 inches, and height H may be 1.25 inches. The thickness of bottom 97 may be 0.25 inches. The thickness of upper portion 93 may be 0.25 inches. Holes 98 may be 3/32 inches in diameter, and openings 99 may be 0.25 inches in diameter. Curved lens holding surface 94 may be given a base curve of 6. FIGS. 4B and 4C are top and bottom views, respectively, of the embodiment of lens holding device 90 shown in FIG. 4A.

Figure 5:
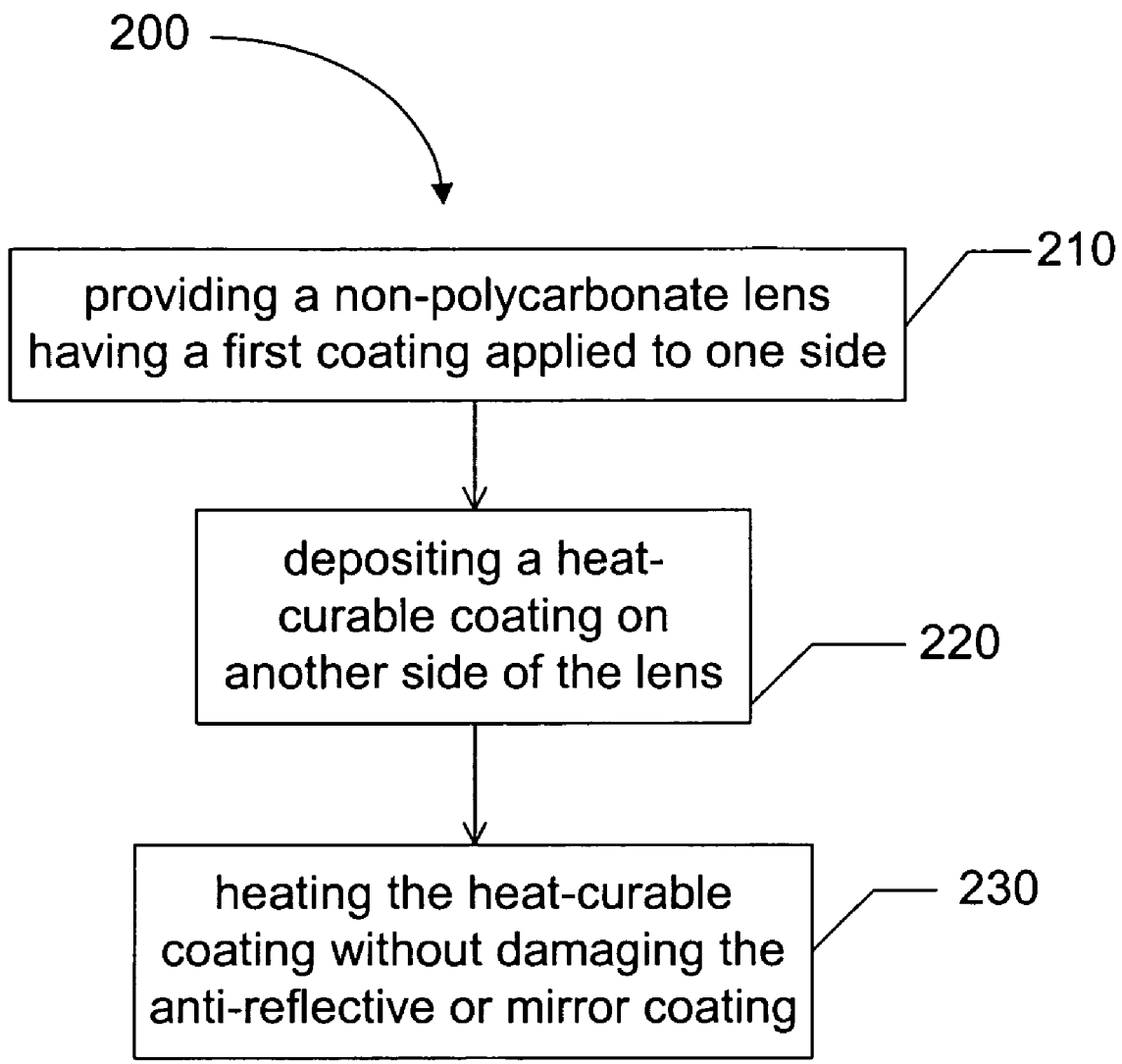
FIG. 5 is a flow chart listing steps of another embodiment of the present methods.

Another embodiment of the present methods is shown in FIG. 5. Method 200 includes step 210, which is providing a non-pure polycarbonate lens, such as a non-pure polycarbonate ophthalmic lens, having a first coating on one of its sides, such as a convex side; step 220, which is depositing a heat-curable coating on another side of the lens, such as a concave side; and step 230, which is heating the heat-curable coating without damaging the first coating.

Lens 50 described above may be used consistently with method 200, provided it is a non-pure polycarbonate lens. The coatings and methods of applying those coatings to the first and second sides of lens 50 described above may be used to arrive at the lens provided in step 210 and carry out step 220. The heating and cooling described above may be used to carry out step 230.

Figure 6:
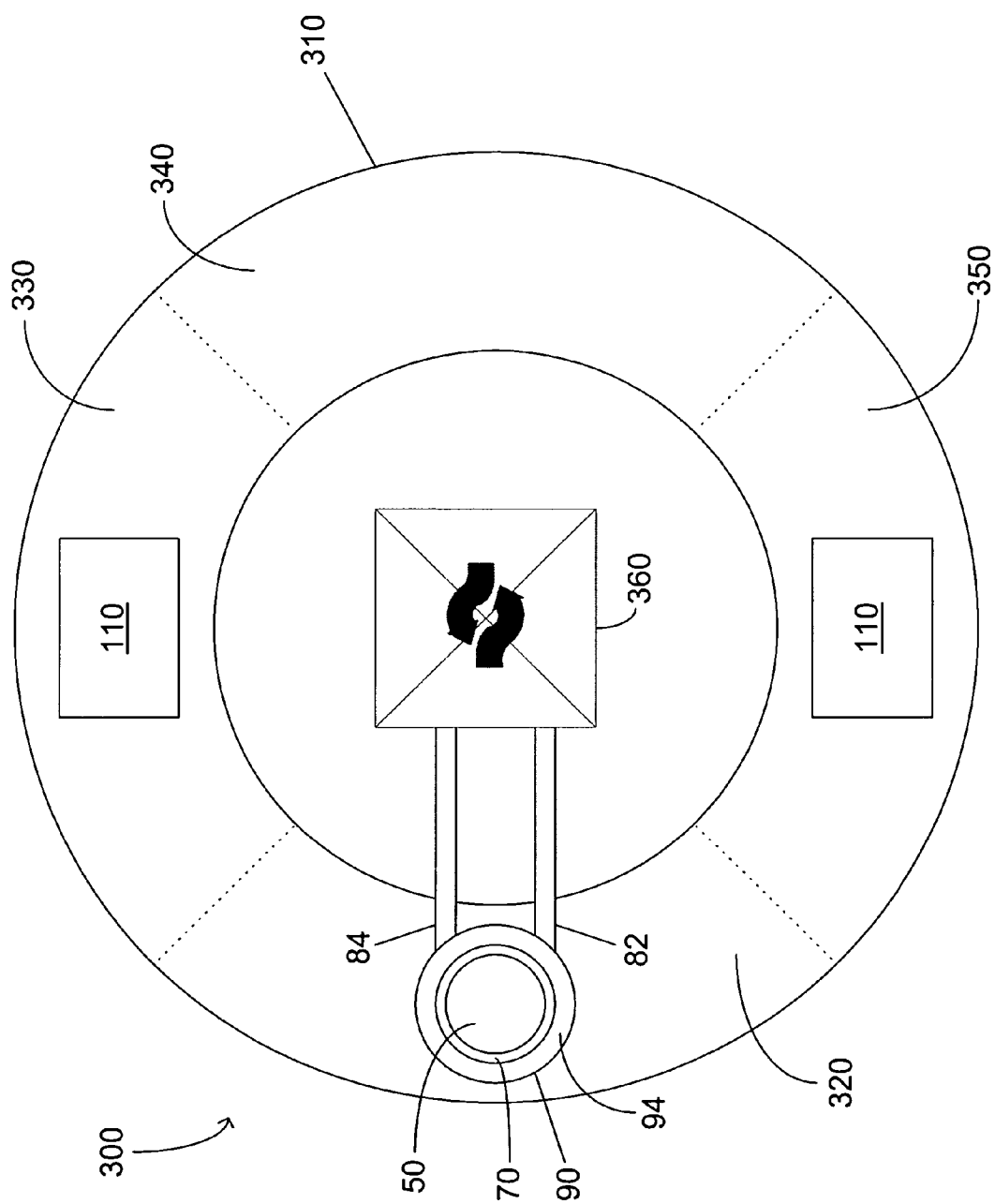
FIG. 6 shows a setup that may be used to carry out one or more steps of the present methods.

Another manner of carrying out step 230 involves intermittent heating. This may be accomplished using the setup shown in FIG. 6. Setup 300 includes rotating conveyor belt 310, which has heating zones 330 and 350 positioned between cooling zones 320 and 340. The zones are generally defined by dashed lines. Heaters 110 are positioned above the conveyor belt in the heating zones. Chiller unit 360 (e.g., a heat exchanger) is positioned in the middle of rotating conveyor belt 310 and is configured to rotate with lens holding device 90 to which it is connected by inlet 82 and outlet 84. Lens 50 is positioned over thin water film 70 resting against curved lens holding surface 94.

One way to carry out the heat curing of step 230 is to intermittently apply heat to the heat-curable coating on lens 50 using setup 300. More specifically, lens 50 may be caused to rotate through heating zones 330 and 350 a total of three times each (i.e., three passes across heating zone 330 and three passes across heating zone 350), spending approximately 1.5 minutes in each zone. Thus, the heat curing takes no more than one hour and, more specifically, no more than 30 minutes. Heaters 110 above heating zones 330 and 350 may be set at 225 to 350° Celsius. Both heaters may be set to blow hot air across lens 50. Alternatively, the heaters may be placed sufficiently close to the exposed surface of lens 50 that the air need not be blown.

The time it takes for the lens holding device to travel through each cooling zone may also be 1.5 minutes. Furthermore, curved lens holding surface 94 may be kept at an average of approximately 5-6° Celsius as lens holding device 90 passes through all four of the zones (cooling zones 320 and 340 are designated as such because no heat from heaters is applied in those zones). This may be accomplished in part using a liquid and, more specifically, using chilled water running through cavity 92 (not shown in FIG. 6) of lens holding device 90.

By operating setup 300 in the manner described above to carry out step 230 of method 200, a coating such as a primer coating, a hard coating, or an anti-reflective or mirror coating on a side of lens 50—such as the convex side—may not reach or exceed 50° Celsius during the heat curing of step 230. While carrying out the heating described above in connection with setup 300, the surface temperature of a heat-curable coating deposited on the concave side of lens 50 may reach a surface temperature of at least 100° Celsius. The curing that may be accomplished by carrying out step 230 as described above in connection with setup 300 may include heat curing multiple coatings (e.g., a hard coating plus an anti-reflective coating) deposited on the concave side of lens 50.

By way of explanation, we believe that one of the reasons why cracking of anti-reflective and mirror coatings has conventionally appeared is likely due to the difference in materials between the layer(s) of the anti-reflective or mirror coating and the other coatings (e.g., hard coatings and primer coatings) or the substrate material, all of which have different thermal expansion coefficients. Anti-reflective and mirror layers, and particularly those described above suited for use as coating 60, are mainly composed of inorganic oxides. More particularly, with the exception of silicon oxide, the anti-reflective layers described above contain only metal oxides.

Figure 7:
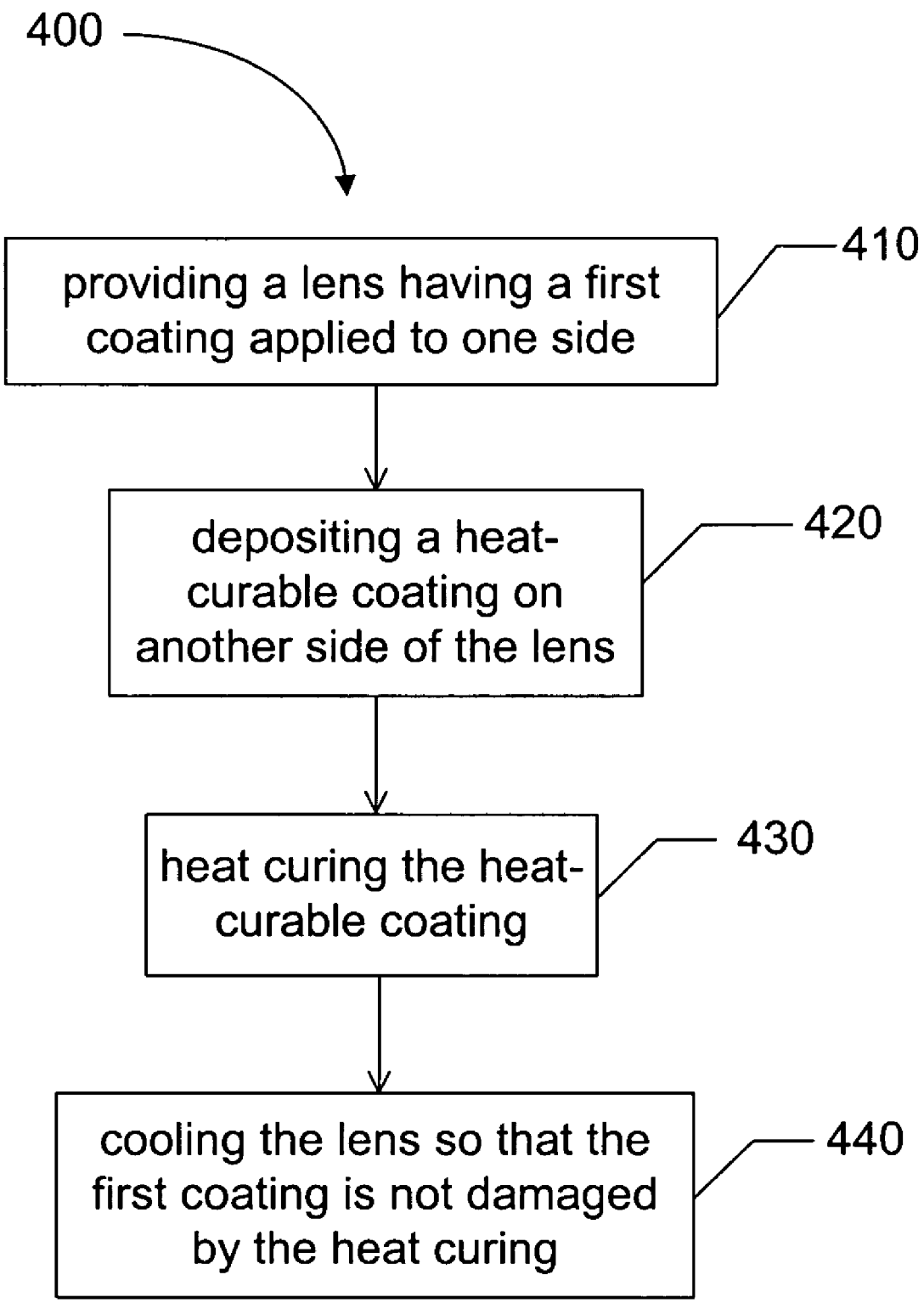
FIG. 7 is a flow chart listing steps of yet another embodiment of the present methods.

Another embodiment of the present methods is shown in FIG. 7. Method 400 includes step 410, which is providing a lens, such as an ophthalmic lens (which may be a polycarbonate lens or a non-pure polycarbonate lens), having a first coating on one of its sides, such as a convex side; step 420, which is depositing a heat-curable coating on another side of the lens, such as a concave side; step 430, which is heat curing the heat-curable coating; and step 440, which is cooling the lens so that the first coating is not damaged by the heat curing.

Lens 50 described above may be used consistently with method 400. The coatings and methods of applying those coatings to the first and second sides of lens 50 described above may be used to arrive at the lens provided in step 410 and carry out step 420. The heat curing and the cooling described above, including the description accompanying setup 300, may be used to carry out steps 430 and 440, respectively. Alternatively, convectively cooling may be used, such as cooling achieved by blowing compressed air on the lens as described below in Example 3.

Figure 8:
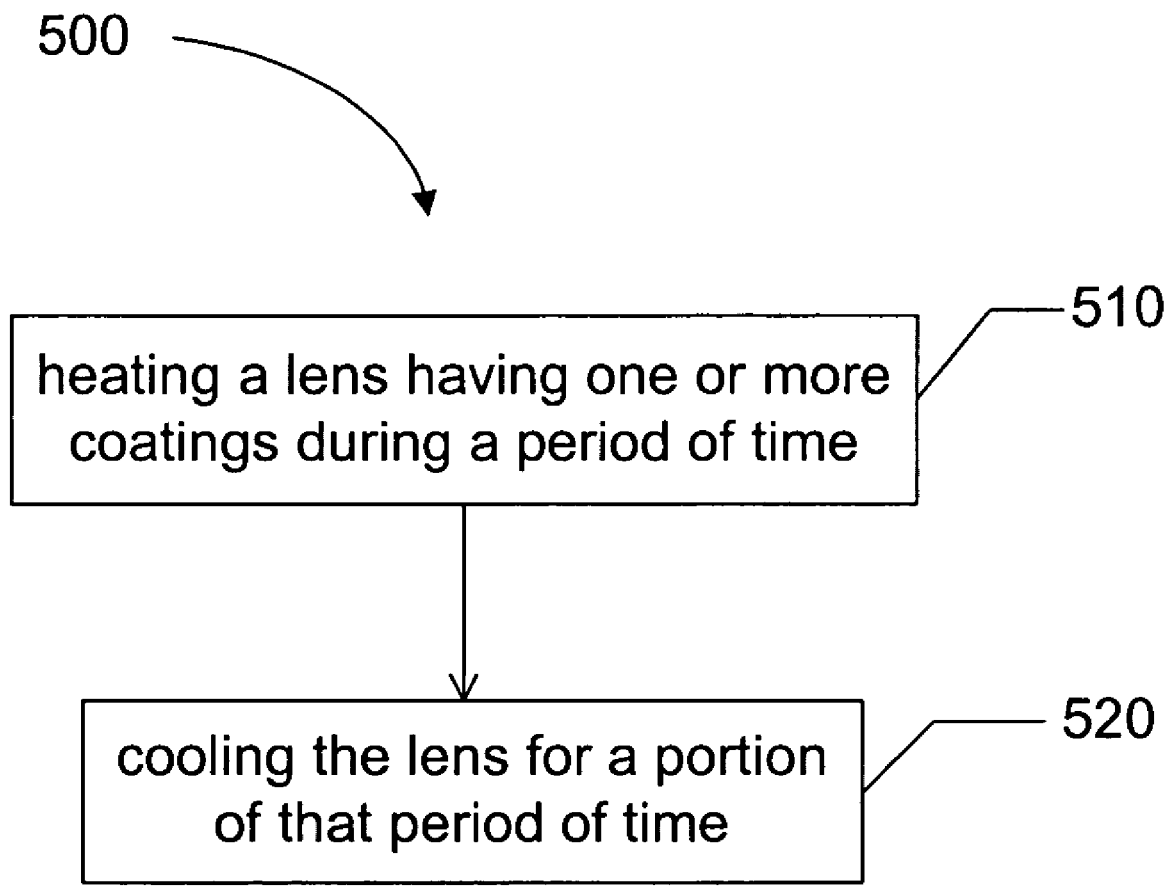
FIG. 8 is a flow chart listing steps of still another embodiment of the present methods.

Still another embodiment of the present methods is shown in FIG. 8. Method 500 is a method of heat curing one or more coatings on a lens, such as an ophthalmic lens (which may be a polycarbonate lens or a non-pure polycarbonate lens). Method 500 includes step 510, which is heating the lens during a period of time. Method 500 also includes step 520, which is cooling the lens for a portion of that period of time. Stated another way, the cooling must take place at the same time as at least a portion of the heating. An example of such heating and cooling are provided above with the discussion of FIG. 3.

Lens 50 described above may be used consistently with method 500. The coating(s) that may be heat cured during method 500 include any of the heat-curable coatings described above.

Another step that may be taken consistently with any of the present methods is surfacing the lens to a prescription power. Those of skill in the art will understand that any suitable method of surfacing a lens may be used. Typically, any surfacing will occur prior to any heat curing, but surfacing may also occur after heat curing is complete.

Consistent with certain embodiments of the present methods, it is possible to quickly heat the heat curable coating, especially an anti-reflecting (AR) or mirror coating, generally deposited on the back side (the concave side) of an optical lens, by using conductive heating, especially infrared (IR) heating, or convection heating, in the latter case preferably by using heated pulsed air, while cooling the opposite side, generally the front side (the convex side) of the lens, this front face wearing an existing AR or mirror coating.

High temperatures of the lens surface may be achieved when implementing the quick heating step.

Typically, one can reach a temperature of 90° C. or more, preferably 140° C. to 170° C., more preferably 150° C. to 170° C. at the surface of the back side, that temperature being maintained during less than 5 minutes, preferably less than 3 minutes and even less than 2 minutes, while cooling the AR or mirror coating deposited on the opposite side, generally the front side, of the lens.

Especially, one can use a heated air gun, the maximum temperature reached by the surface of the heat curable coating, preferably AR coating, being in that case 170° C.

The following examples are included to demonstrate a specific, non-limiting embodiments of the present methods. It should be appreciated by those of skill in the art that the techniques disclosed in the following examples represent techniques discovered by the inventors to function in the practice of certain methods of the invention, and thus constitute specific modes for its practice. However, those of skill in the art should, in light of this disclosure, appreciate that changes can be made to the techniques and materials of the following examples and still obtain a like or similar result without departing from the scope of the invention.

EXAMPLE 1

A finished single vision ORMA lens, −2.00 power, was provided. The center thickness of the lens was about 1.0 millimeters. AR coating 1 was applied to the convex side of the lens. More specifically, a hard coating according to HC 1 and AR coating 1 were applied to the convex side of the lens. A combination of a primer coating (W 234 by Baxenden) (applied first) and HC 1 (applied on the primer coating) was applied to the concave side through spin coating.

Figure 9:
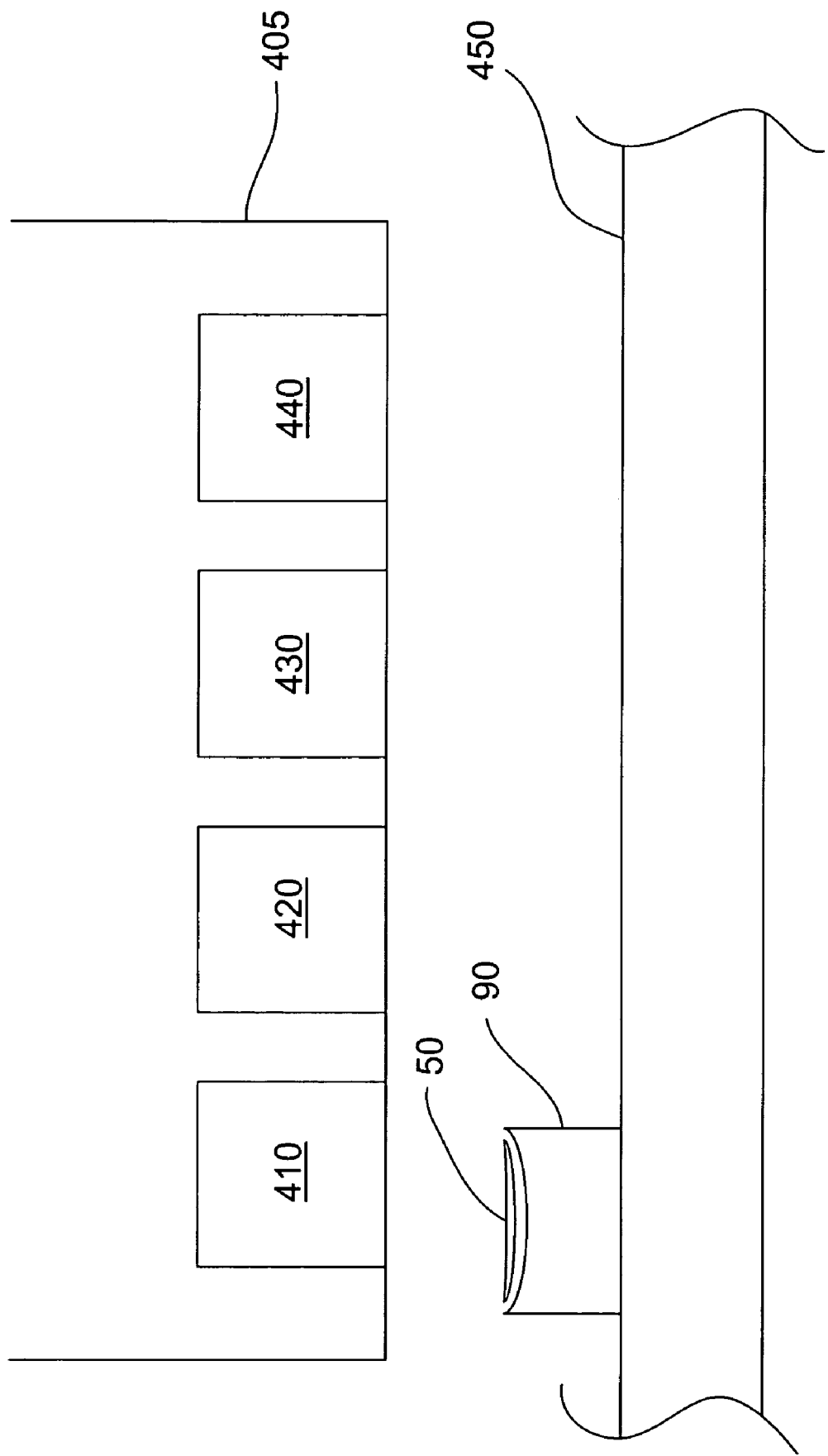
FIGS. 9-11 shows different setups used during testing of certain of the present methods.

The setup for this example is shown in FIG. 9. The setup shows that the lens used, designated as lens 50, was placed on an aluminum block, which is one version of lens holding device 90. The aluminum block was 80 millimeters (mm) in diameter and 31 mm thick at its thinnest point with a wall thickness of 6.3 mm. The aluminum block was refrigerated in a freezer set to −18° Celsius. The surface temperature of the block was roughly 7° Celsius at the time of use. A thin water film was placed between the block and the lens.

The aluminum block and lens were positioned on a conveyor belt positioned within a DIMA SMRO-0252 infrared oven 405 that included four separate heaters, designated 410, 420, 430, and 440 in FIG. 7. Heaters 410, 420, 430, and 440 were set at 225° Celsius, 250° Celsius, 325° Celsius, and 350° Celsius, respectively. While the DIMA oven also contained 4 heaters positioned below conveyor belt 450 opposite heaters 410-440, those heaters were not used, and remained at 10° Celsius throughout the testing. The speed of conveyor belt 450 was 0.3 meters/minute. The heaters 410-440 were positioned approximately 2 inches above the top of the aluminum block. The spacing of the heaters 410-440 relative to each other was such that the aluminum block passed beneath all four heaters in three minutes.

After the aluminum block and lens passed beneath all four active heaters, the lens was retrieved from the block and brought back to the starting point. A new aluminum block, with the same properties as the first block (and chilled in the same manner), was chosen and the lens placed on it. The new block and lens then made another pass beneath the heaters 410-440 in the same fashion as the first pass. The process was repeated a total of 7 to 8 times, and three of the lens described above were tested in this fashion. Between one and three minutes elapsed between passes.

The temperature of the convex surface of the lenses was measured using a thermocouple taped to the center of the convex side using insulating heat resistant tape. An average temperature profile (in degrees Celsius) of the convex surface of the lenses appears below:

|  | Time | | | | |
| --- | --- | --- | --- | --- | --- |
|  | 0 minutes | 1 minute | 2 minutes | 2.5 minutes | 3 minutes |
| Temperature | 21 | 30 | 35 | 39 | 48 |

The maximum convex surface temperature detected was 48° Celsius.

It was determined that it took two passes beneath all four heaters to cure the latex primer coating on the concave side of each lens. It was also determined that it took 4-6 passes beneath all four heaters to heat cure the hard coating on the concave side of each lens. It was determined that the temperature of the concave side of each lens reached, on average, a temperature of 110-120° Celsius in the areas beneath heaters 430 and 440.

The temperature of the concave side of the lenses was measured indirectly during "dry" runs. Specifically, during a run with no heat curable coating on the concave side of the lens, a thermocouple was taped to the concave side of the lens using insulating heat resistant tape that covered the thermocouple so that it would not be affected by direct radiant heat from the heaters.

The AR coating 1 on the convex side was not damaged. No hard coating cracking was seen after the heat curing. All three of the lenses evaluated in this manner passed the dry adhesion test and the 30-minute boil test described above. Cracking of the concave-side hard coating was seen during at least one boiling test, but this was expected.

EXAMPLE 2

A finished single vision ORMA lens, −2.00 power, was provided. The center thickness of the lens was about 1.0 millimeters. AR coating 1 was applied to the convex side of the lens. More specifically, a hard coating according to HC 1 and AR coating 1 were applied to the convex side of the lens. No coatings were applied to the concave side of the lens—the experiment was run dry.

Figure 10:
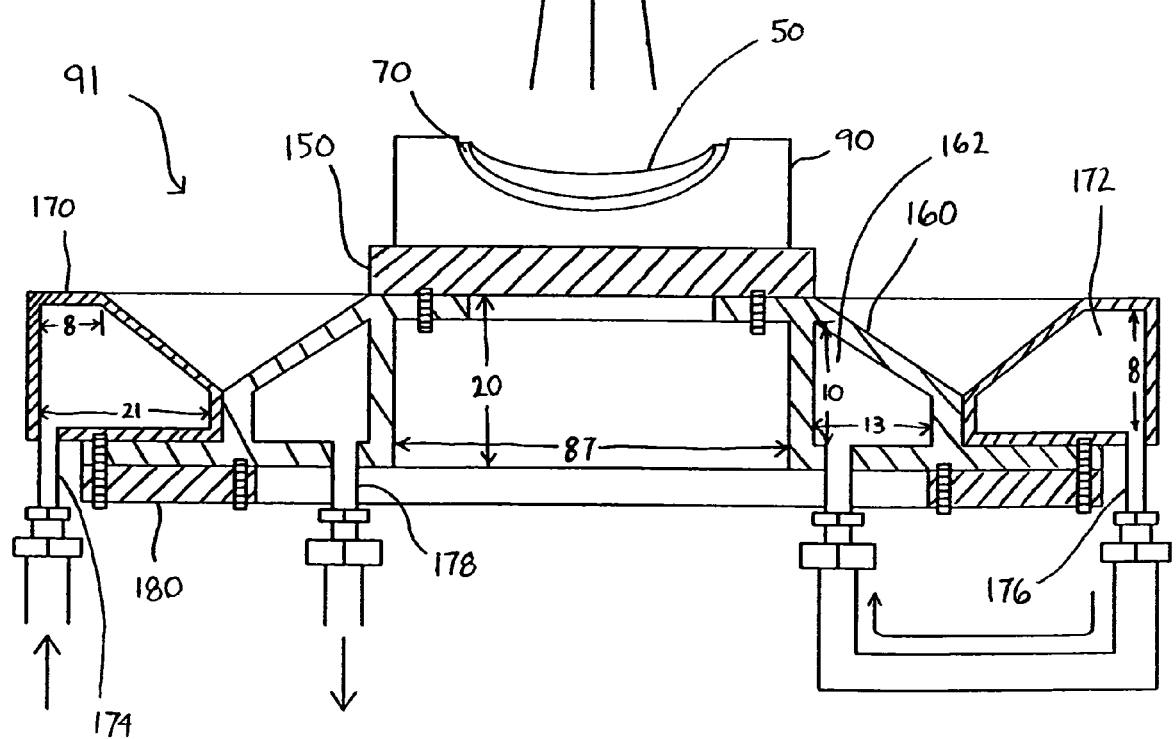

The setup for this example is shown in FIG. 10. Setup 600 shows that the lens used, designated as lens 50, was placed on an aluminum block, which is one version of lens holding device 90. The aluminum block was 80 millimeters (mm) in diameter and 31 mm thick at its thinnest point with a wall thickness of 6.3 mm. The aluminum block was sitting on a cold water chuck, designated generally by 91 and shown in cross section.

Chuck 91 included stainless steel plate 150, which was 10 mm thick and 100 mm in diameter. Plate 150 was attached to a hollow stainless steel cooling drum 160, the walls of which were 4 mm thick. Drum 160 included cavity 162. Drum 160 was attached to a stainless steel ring 170, the walls of which were 2 mm thick. Ring 170 included cavity 172. Enlarged stainless steel washer 180 (10 mm thick) was used to attach drum 160 to ring 170. Cavity 172 of ring 170 was connected to a one-quarter inch stainless steel inlet tube 174. Opposite inlet tube 174 was transfer tube (same size and material) 176 that connected cavity 172 to cavity 162 of drum 160. The opposite side of drum 160 also included a one-quarter inch stainless steel outlet tube 178.

Enlarged washer 180 had an outer diameter of 150 mm and an inner diameter of 105 mm. Ring 170 was 170 mm wide at its widest point. Drum 160 was 120 mm wide at the outside of the widest portion bordering cavity 162. Dimensions of the cavities of the drum and ring, along with other drum and ring dimensions, are shown in FIG. 10 in mm.

A chilling unit (not shown) was used to circulate cold water through chuck 91 in the direction of the arrows shown in FIG. 10. The temperature of the water entering cavity 172 was roughly 14° Celsius. Water exiting chuck 91 through outlet tube 178 was returned to the chilling unit, where it was cooled and directed back into ring 170 in a closed loop process.

A thin water film 70 was placed between block 90 and lens 70.

Chuck 91, aluminum block 90, and lens 50 were positioned beneath a hot air gun 615, the discharge end of which was positioned 6 inches from the surface of the center of lens 50. Hot air gun was a model VT-750C from Master Appliance Corp. (Racine, Wis.). The maximum temperature of the air that could be generated by the hot air gun was 1000° Fahrenheit/538° Celsius. The hot air gun operated at 1740 watts of power and provided an air flow rate of 23 cubic feet per minute.

Hot air gun 615 was operated so as to keep the concave surface of the lens at about 100° Celsius for 18 minutes. At the same time, the lens was cooled using block 90, water film 70, chuck 91, and the chiller to which chuck 91 was attached. The temperature of the concave side of the lens was measured using a thermocouple as described above in Example 1.

The temperature of the convex surface of the lenses was measured using a thermocouple taped to the center of the convex side using insulating heat resistant tape. An average temperature profile (in degrees Celsius) of the convex surface of the lenses appears below:

| | Time | | | | | |
|---|---|---|---|---|---|---|
| | 0 min | 3 min | 5 min | 10 min | 15 min | 18 min |
| Temperature | 17 | 34 | 39 | 42 | 43 | 43 |

On the convex side, neither the AR coating 1 nor the HC 1 coating was damaged as a result of the heat curing.

EXAMPLE 3

A finished single vision ORMA lens, piano power, was provided. The center thickness of the lens was about 1.0 millimeters. AR coating 1 was applied to the convex side of the lens. More specifically, a hard coating according to HC 1 and AR coating 1 were applied to the convex side of the lens. No coatings were applied to the concave side of the lens—the experiment was run dry.

Figure 11:
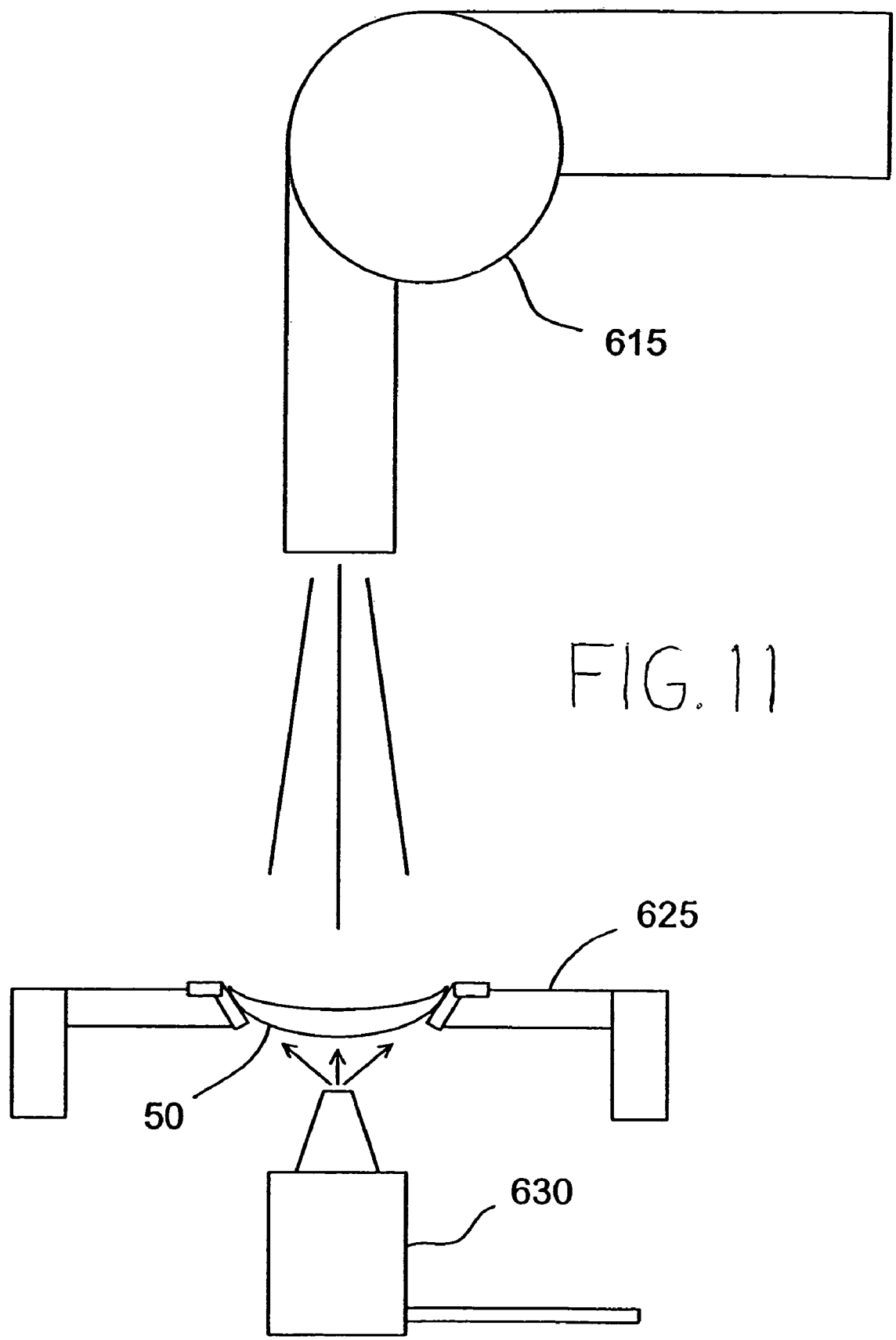

The setup for this example is shown in FIG. 11. The setup shows that the lens used, designated as lens 50, was placed in a holding chuck 625. Holding chuck 625 and lens 50 were positioned beneath a hot air gun 615 (the same gun used in Example 2), the discharge end of which was positioned 6 inches from the surface of the center of lens 50.

Hot air gun 615 was operated so as to keep the concave surface of the lens at about 100° Celsius for 18 minutes. At the same time, the lens was cooled using compressed air delivered through nozzle 630. The compressed air was delivered under 30 pounds per square inch (psi) pressure. The nozzle was positioned 4 inches from the center of the convex side of lens 50. A thermocouple was taped with insulating heat resistant tape to the center of the concave surface of the lens as described above. A thermocouple was taped in the same fashion to the center of the convex side of the lens.

An average temperature profile (in degrees Celsius) of the convex surface of the lenses appears below:

| | Time | | | | | |
|---|---|---|---|---|---|---|
| | 0 min | 3 min | 5 min | 10 min | 15 min | 18 min |
| Temperature | — | 27 | 29 | 32 | 32 | 33 |

On the convex side, neither the AR coating 1 nor the HC 1 coating was damaged as a result of the heat curing.

EXAMPLE 4

The following experiments were designed to keep an anti-reflective coating on the convex side of a polycarbonate lens sufficiently cool while heat curing one or more heat curable coatings on the concave side of the lens such that no damage occured as a result of the heat curing.

Control

A surfaced polycarbonate lens having an anti-reflective coating similar in composition to AR coating 1 on its convex side and a 1.6 index hard coat referred to generally in the art as a non-tintable polycarbonate coating on its concave side was heat cured. The 1.6 index hard coat was approximately 3 microns thick, and was made of a composition comprising the following components:

a GLYMO hydrolyzate,
a titanium oxide colloid, and
an aluminum acetylacetonate catalyst.

The heat curing was carried out using a CASSO-SOLAR infrared heater model FB that was 6 inches by 6 inches (shaped somewhat like a flat tile, the "IR heater" for this example) and placed at a height of 4 centimeters (cm) from the middle of the concave side of the lens for 15 minutes. The heater was set at 350° Celsius. Any differences between the composition of AR coating 1 and the anti-reflective coating used in this control experiment and in Experiments A, B, and C described below are believed to be so slight that the results of these experiments would have been no different had AR coating 1 been used instead.

Experiment A

A PYREX petrie dish, 90 mm in diameter and 20 mm high, was filled to several mm from the top with water chilled to 4° Celsius. The same type of lens having the same coatings as were used in the control experiment was used for this experiment. The lens was then placed into the petrie dish containing the cold water, and positioned under the IR heater at a height of 4 cm from the center of the concave side of the lens to the end of the IR heater.

Experiment B

The same type of lens having the same coatings as were used in the control experiment was positioned on a previously refrigerated FRIGID ICE gel pack from TECH PAK and placed under the IR heater at a distance of 4 cm, as described above.

Experiment C

The same type of lens having the same coatings as were used in the control experiment was positioned on an activated ACE INSTANT COLD pack (containing a solution of ammonium nitrate and water), and then placed under the IR heater at a distance of 4 cm, as described above.

The following table summarizes the results of the inspection of the anti-reflective coating using high intensity halogen lighting. The surface temperatures (in degrees Celsius) of the concave surface temperatures of the tested lenses (and, more specifically, of the surface temperatures of the anti-reflective coatings of the tested lenses) were measured by the OMEGASCOPE Model OS71 Infrared Camera:

| Experiment | Lens Temp | Cooling Media Temp | Anti-Reflective Coating Damage (e.g., crazing) |
|---|---|---|---|
| Control | $t^0 = 24$ $t^{15} = 104$ | N/A | Yes, entire surface |
| A | $t^0 = 23$ $t^{15} = 49$ | $t^0 = 5.7$ $t^{15} = 55$ | No |
| B | $t^0 = 24$ $t^{15} = 53$ | $t^0 = 0$ $t^{15} = 22$ | Yes, slight crazing on edges where the lens was not touching the gel pack |
| C | $t^0 = 24$ $t^{15} = 40$ | $t^0 = 0$ $t^{15} = 24$ | No |

We also tested the scratch resistance of the 1.6 index hard coatings cured in the fashion of experiments A, B, and C, and it appears that scratch resistance was not compromised through the heat curing. Specifically, the concave surface of a plano polycarbonate lens was coated with the 1.6 index hard coating used in the control experiment and cured under the IR heater (at the same 4 cm distance used above) for 15 minutes both with, and without, the experiment A heat sink (i.e., the petrie dish). A reverse steel wool method was used to test the scratch resistance of the cured hard coat. The control result (i.e., not experiment A heat sink) of the reverse steel wool method was 2.96 and the experiment A result was 2.81.

From this data, we conclude that the use of the foregoing heat sinks while heat curing (e.g., using an infrared heater) the concave surface of a polycarbonate lens having an anti-reflective coating on the convex side is technically feasible to eliminate the crazing phenomenon of the anti-reflective coating without compromising the performance of the heat cured coating.

EXAMPLE 5

A semi-finished polycarbonate lens having an anti-reflective coating similar in composition to AR coating 1 applied by vacuum deposition on its convex side was surfaced to a −2.00 prescription power. Any differences between the composition of AR coating 1 and the anti-reflective coating used in this example are believed to be so slight that the results of this example would have been no different had AR coating 1 been used instead. A UV-curable coating was applied to the concave side of the lens as a tintable coating and a primer coating for subsequent coatings. A 1.6 index hard coating was applied to the primer coating. The 1.6 index hard coat was 1.9 microns thick, and was made of a composition comprising the following components:

a GLYMO hydrolyzate,
a titanium oxide colloid, and
an aluminum acetylacetonate catalyst.

A PYREX petrie dish, 90 mm in diameter and 20 mm high, was filled to several mm from the top with water chilled to 2° Celsius. The lens was placed in the water, convex side down, and the IR heater referenced in Example 4 was set at a temperature of 350° Celsius and placed 4 cm away from the center of the concave side of the lens. The initial temperature of the lens was 24° Celsius. The lens temperature was measured using the infrared camera from Example 4.

The anti-reflective coating on the convex side of the lens was not damaged after 15 minutes of the heating. This heating took the form of heat curing and, more specifically, pre-curing. After 15 minutes, the water temperature was 31° Celsius, the surface temperature of the convex side of the lens was 38° Celsius, and the surface temperature of the concave side of the lens was 41° Celsius. The temperature measurements of the lens sides after the heating were taken by taking the lens out of the water and quickly using the infrared camera to ascertain the temperature of each side.

EXAMPLE 6

A semi-finished polycarbonate lens having the anti-reflective coating used in Example 5 applied by vacuum deposition on its convex side was surfaced to a −2.00 prescription power. As with Example 5, any differences between the composition of AR coating 1 and the anti-reflective coating used in this example are believed to be so slight that the results of this example would have been no different had AR coating 1 been used instead. A UV-curable coating was applied to the concave side of the lens as a tintable coating and a primer coating for subsequent coatings. The 1.6 index hard coating described in Example 5 was applied to the primer coating.

Figure 12:
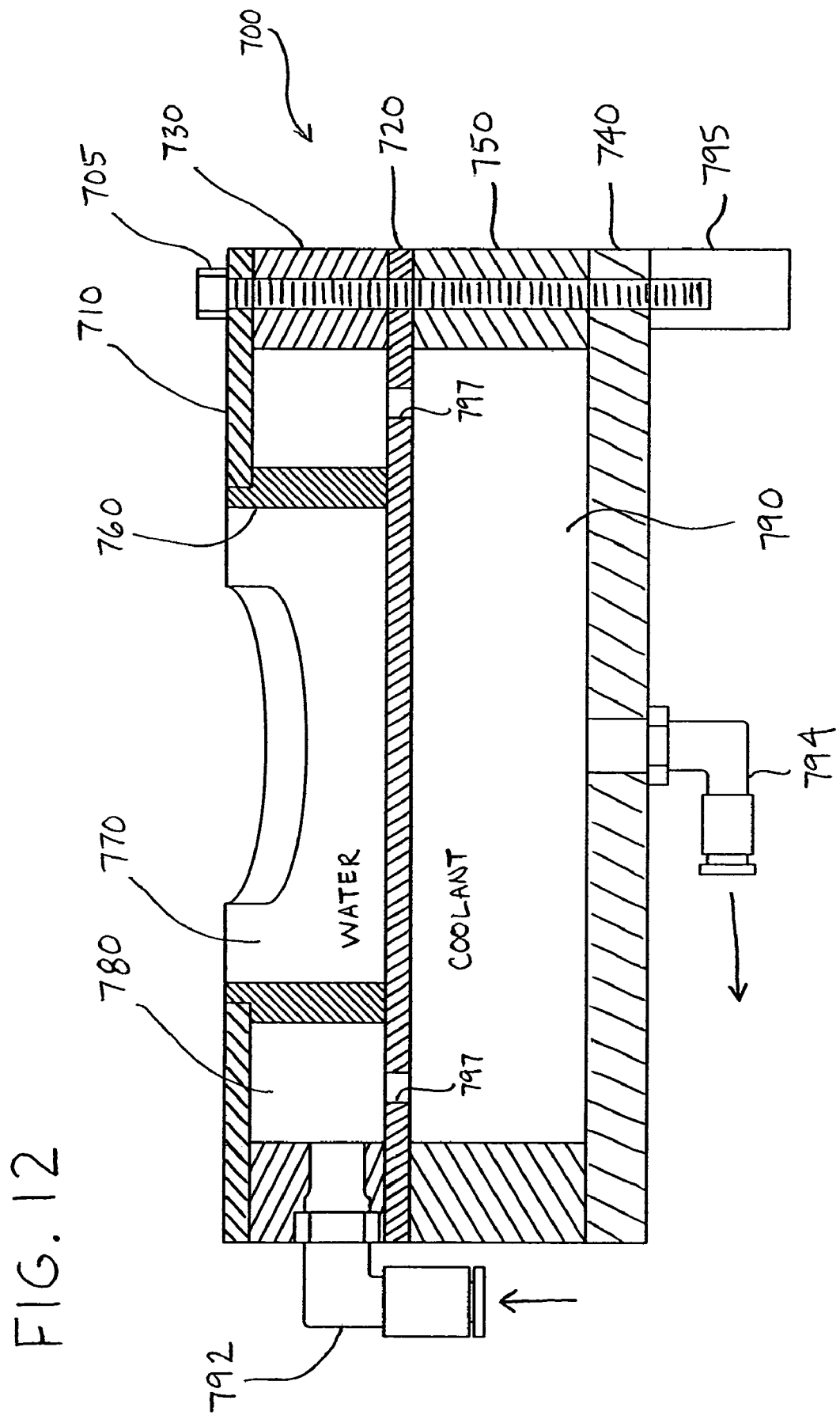
FIG. 12 is a diagram of a heat exchanger used in testing certain of the present methods.

Heat exchanger 700, shown in cross section in FIG. 12, was used to cool the convex side of the lens (shown as lens 50 in the figure). Heat exchanger 700 included a top plate 710 made of aluminum. Top plate 710 was separated from divider plate 720 (also made of aluminum) by top ring 730. Divider plate 720 was separated from bottom plate 740 (also made of aluminum) with bottom ring 750. Heat exchanger 700 also included an inner ring 760 that defined water cavity 770 and coolant cavity 780. RTV joint sealing compound was used to seal the joints of heat exchanger 700. Divider plate 720, bottom ring 750 and bottom plate 740 defined main coolant cavity 790. Heat exchanger 700 included 3 legs 795 (only 1 shown) on which it stood. Overall, heat exchanger 700 was 3 inches in height and 7 inches in diameter. The plates of the heat exchanger were held together using 8-32 screws 705.

Water cavity 770 was filled with water. A coolant comprised of 50% water and 50% PRESTONE anti-freeze was pumped into coolant cavity 780 through inlet 792 at the rate of 2 liters per minute. The coolant would circulate through coolant cavity 780, keeping the water cool, and flow into main coolant cavity 790 through openings 797 in divider plate 720. The coolant would then flow out of main coolant cavity 790 through outlet 794, was re-cooled, and re-circulated back through the heat exchanger.

The lens was placed in the water, convex side down, and the IR heater from Example 5 was set to a temperature of 350° Celsius and positioned relative to the concave side of the lens as it was in Example 5. The anti-reflective coating on the convex side of the lens was not damaged after 10 minutes of the heating. This heating took the form of heat curing and, more specifically, pre-curing.

After the 10 minutes of heating, a 1.75 index layer that was part of a 2-layer sol-gel anti-reflective coating was deposited on the 1.6 index hard coating. The 1.75 index layer was 308 nm thick, and was made of the following:

| Material | Percentage of composition |
| --- | --- |
| GLYMO | 5.106 |
| 0.1 N HCL | 1.192 |
| Diacetone alcohol | 28.372 |
| Ethanol | 37.451 |
| NISSAN CHEMICAL COMPANY HIT-32 M (colloidal titanium oxide) | 26.828 |
| Al(Acac)$_3$ (Aluminum Acetylacetonate) | 0.852 |
| 3 M FLUORAD FC430 (fluorine-containing surfactant) | 0.198 |

The 1.75 index layer was then heated for 10 minutes using the IR heater, set to 350° Celsius and positioned as it was above. The anti-reflective coating on the convex side of the lens was not damaged after 10 minutes of the heating. This heating took the form of heat curing and, more specifically, pre-curing.

Next, the second of the 2-layer sol-gel anti-reflective coating—a 1.41 index layer—was deposited on the 1.75 index layer. The 1.41 index layer was 92 nm thick, and was made of the following:

| Material | Percentage of composition |
| --- | --- |
| Methyl trimethoxysilane (Union Carbide A-163) | 10.13 |
| Methanol | 47.72 |
| NALCO | 40.46 |

| Material | Percentage of composition |
|---|---|
| CHEMICAL COMPANY 1034A (colloidal silica) | |
| Al(Acac)$_3$ (Aluminum Acetylacetonate) | 1.69 |

The 1.41 index layer was then heated for 10 minutes using the IR heater, set to 350° Celsius and positioned as it was above. The anti-reflective coating on the convex side of the lens was not damaged after 10 minutes of the heating. This heating took the form of heat curing and, more specifically, pre-curing.

Finally, the coating system comprised of the UV-curable coating, the 1.6-index hard coating, and the sol-gel anti-reflective coating (made of the 1.75-index and the 1.41-index layers) was heated for 15 minutes using the IR heater, set to 350° Celsius and positioned as it was above. Prior to the last 15 minutes of heating, the temperature of the water in heat exchanger 700 was 5.7° Celsius, and the initial temperature of the lens was 22° Celsius. This and the temperature measurements described below were taken using the infrared camera from Example 5.

The anti-reflective coating on the convex side of the lens was not damaged after the 15 minutes of the heating. At the 15-minute mark, the water temperature was 50° Celsius, the temperature of the convex side of the lens was 48° Celsius, and the temperature of the concave side of the lens was 50° Celsius. This 15 minutes of heating took the form of heat curing and, more specifically, post-curing.

EXAMPLE 7

A semi-finished ORMA lens having AR coating 1 vacuum deposited on its convex side was surfaced to a −2.00 prescription power. A 1.6 index hard coating similar in composition to HC 1 was applied to the convex side of the lens. Any differences between the composition of HC 1 and the 1.6 index hard coating used in this example are believed to be so slight that the results of this example would have been no different had HC 1 been used instead.

The heat exchanger described in Example 6 was used to cool the convex side of the lens. The lens was placed in the water, convex side down, and the IR heater from Example 5 was set to a temperature of 350° Celsius and positioned relative to the concave side of the lens as it was in Example 5. The anti-reflective coating on the convex side of the lens was not damaged after 10 minutes of the heating. This heating took the form of heat curing and, more specifically, pre-curing.

After the 10 minutes of heating, a 1.75 index layer that was part of a 2-layer sol-gel anti-reflective coating was deposited on the 1.6 index hard coating. The 1.75 index layer was 308 nm thick, and was made of the following:

| Material | Percentage of composition |
|---|---|
| GLYMO | 5.106 |
| 0.1N HCL | 1.192 |
| Diacetone alcohol | 28.372 |
| Ethanol | 37.451 |
| NISSAN CHEMICAL COMPANY HIT-32M (colloidal titanium oxide) | 26.828 |
| Al(Acac)$_3$ (Aluminum Acetylacetonate) | 0.852 |
| 3M FLUORAD FC430 (fluorine-containing surfactant) | 0.198 |

The 1.75 index layer was then heated for 10 minutes using the IR heater, set to 350° Celsius and positioned as it was above. The anti-reflective coating on the convex side of the lens was not damaged after 10 minutes of the heating. This heating took the form of heat curing and, more specifically, pre-curing.

Next, the second of the 2-layer sol-gel anti-reflective coating—a 1.41 index layer—was deposited on the 1.75 index layer. The 1.41 index layer was 92 nm thick, and was made of the following:

| Material | Percentage of composition |
|---|---|
| Methyl trimethoxysilane (Union Carbide A-163) | 10.13 |
| Methanol | 47.72 |
| NALCO CHEMICAL COMPANY 1034A (colloidal silica) | 40.46 |
| Al(Acac)$_3$ (Aluminum Acetylacetonate) | 1.69 |

The 1.41 index layer was then heated for 10 minutes using the IR heater, set to 350° Celsius and positioned as it was above. The anti-reflective coating on the convex side of the lens was not damaged after 10 minutes of the heating. This heating took the form of heat curing and, more specifically, pre-curing.

Finally, the coating system comprised of the 1.6-index hard coating and the sol-gel anti-reflective coating (made of the 1.75-index and the 1.41-index layers) was heated for 15 minutes using the IR heater, set to 350° Celsius and positioned as it was above. Prior to the last 15 minutes of heating, the temperature of the water in the heat exchanger was 15° Celsius, and the initial temperature of the lens was 24° Celsius. This and the temperature measurements described below were taken using the infrared camera from Example 5.

The anti-reflective coating on the convex side of the lens was not damaged after the 15 minutes of the heating. At the 15-minute mark, the water temperature was 25° Celsius, the temperature of the convex side of the lens was 25° Celsius, and the temperature of the concave side of the lens was 30° Celsius. This 15 minutes of heating took the form of heat curing and, more specifically, post-curing.

EXAMPLE 8

An anti-reflecting coating (AR) is formed on the back side of a lens as described below:

Typically, a sol-gel antireflective coating is applied on the back side of a lens made of poly[diethyleneglycolbis(allylcarbonate)] already coated on its front (convex) side with HC1 and AR1, and on its back (concave) side with HC1.

A high refractive index HI solution (between 0.5 to 5 ml) is deposited by spin coating on the back side of the lens, i.e. on the HC1 coating. The rotation speed is around 2100 revolutions per minute.

A precuring step is then implemented: conduction heating with an IR source of 450 watts of power is placed close to the surface of the substrate for 16 seconds.

The temperature of the surface of the back side increases from 25° C. to 70-80° C. at the end of the precuring step.

The back side is then cooled for 50 seconds with an air flux at ambient temperature.

Then a low refractive index (LI) solution (between 0.5 to 5 moles) is deposited by spin coating on the precured HI layer. The rotation speed is 1850 revolutions per minute.

A precuring step (same heating source as above) is then implemented for 8 seconds, followed by a cooling step (same as above).

A cooling of the front side of the lens can be implemented during the precuring steps.

A final heating of the stack HI coating/LI coating is then carried out.

One uses a heating gun to pulse heated air towards the stack of the back side.

The maximum temperature at the surface of the back side reaches 170° C.

Concomitantly, pulsed air at ambient temperature or lower is directed towards the front side of the lens.

One obtains a final lens with two AR stacks on both sides and no cracking on the AR stack situated on the front side (convex side).

Preparation of the Solutions for the AR Coating Usable in this Example:

Preparation of a high refractive index (HI) solution:

90.45 grams (g) of glycidoxypropyltrimethoxysilane (Sivento) are weighed and poured in a beaker and then stirred.

Then 20.66 g of acidic water (HC 10.1 N) are added drop by drop.

When the whole amount of water has been added, the resulting hydrolyzate is still stirred for 15 minutes.

Then, in another beaker, 640 g of $TiO_2$ colloid Optolake 1120 Z 11RU-7 A8 from CCIC are added to 160 g of methanol, the resulting mixture being stirred at ambient temperature for 15 minutes.

800 g of the resulting mixture colloid/methanol are added to the glycidoxypropyltrimethoxysilane hydrolyzate.

The obtained solution is stirred at ambient temperature for 24 hours.

9.14 g of aluminumacetylacetonate (Aldrich) are weighed and added to the above solution, which is furthered stirred for one hour at ambient temperature.

Then, the dry extract is measured, and is around 20% by weight.

Isopropanol is then added in such an amount that the dry extract reaches only 6% by weight.

After stirring for 5 hours, the solution is filtered with a 3 micrometer filter to obtain a HI solution which can be stored in a freezer at a temperature of −18° C.

Preparation of a Low Refractive Index (LI) Solution Usable in this Example:

One mixes 8.1 g of tridecafluoro-1,1,2,2-tetrahydrooctyl-1-triethoxysilane $C_{14}H_{19}F_{13}O_3Si$ (Roth Sochiel) and 65.6 g of tetraethoxysilane $Si(OC_2H_5)_4$ (from Keyser Mackey).

After stirring for 15 minutes, 26.3 g of 0.1 N hydrochloric acid are added.

The resulting mixture is stirred for 24 hours at ambient temperature.

Then 737.7 g of 2-methyl-2-butanol (Sigma Aldrich) and 316.2 g of 2-butanone (Carlo Eba) and 0.28 g of catalyst Polycat-SA-1/10 (Air products) are added. The resulting solution is then stirred for 2 hours and then filtered using a filter having a porosity of 0.1 micrometers. The resulting LI solution may be stored in a freezer at −18° C.

It should be understood that the present methods are not intended to be limited to the particular forms disclosed. Rather, they cover all modifications, equivalents, and alternatives falling within the scope of the claims. For example, any manner of cooling a lens holding device may be used consistently with these methods provided no damage results to the convex coatings during the heat curing as detailed above.

The claims are not to be interpreted as including means-plus- or step-plus-function limitations, unless such a limitation is explicitly recited in a given claim using the phrase(s) "means for" or "step for," respectively.

We claim:

1. A method comprising:
providing a lens having a first side, a second side, and a first coating on the first side;
depositing a heat-curable coating on the second side of the lens; and
heating the heat-curable coating during a period of time without damaging the first coating, wherein the lens is cooled during the heating of the heat-curable coating for at least a portion of said period of time to prevent the first coating from being damaged by the heating.

2. The method according to claim 1, wherein the first coating is an anti-reflective or mirror coating.

3. The method according to claim 2, wherein the mirror coating comprises one or more layers of dielectric oxides.

4. The method according to claim 2, wherein the anti-reflective coating is a mono-or multilayer film of dielectric material.

5. The method according to claim 4, wherein the dielectric material is selected from the group consisting of: SiO, SiO2, Si3N4, TiO2, ZrO2, Al2O3, MgF2, Ta2O5 and mixtures thereof.

6. The method according to claim 3, wherein the dielectric oxides are selected from the group consisting of: SiO, SiO2, TiO, and ZrO2.

7. The method according to claim 1, wherein the first coating is a hard coating.

8. A method according to claim 7, wherein the hard coating or layer comprises hydrolyzates of polyalkoxysilanes.

9. The method according to claim 8, wherein the hydrolyzates of polyalkoxysilanes are selected from the group consisting of epoxytrialkoxysilanes and epoxydialkoxysilanes.

10. The method according to claim 8, wherein the hard coating or layer comprises fillers selected from the group consisting of: SiO2, TiO2, Sb2O5, Al2O3 and Fe2O3.

11. The method according to claim 1, wherein the lens includes a second coating applied to the first coating.

12. The method according to claim 11, wherein the first coating is a hard coating and the second coating is an anti-reflective or mirror coating.

13. The method according to claim 12, wherein the hard coating includes a primer layer and a hard layer.

14. The method according to claim 13, wherein the primer coating or layer is an impact-resistant primer coating chosen from (meth)acrylic based coatings and polyurethane based coatings.

15. The method according to claim 14, wherein the primer coating or layer is made from a latex composition selected from the group consisting of: poly(meth)acrylic latexes, polyurethane latexes and polyester latexes.

16. The method according to claim 11, wherein the first coating is a primer coating and the second coating is a hard coating.

17. The method according to claim 11, wherein the heating results in heat curing the heat-curable coating such that neither the first coating nor the second coating is damaged by the heat curing.

18. The method according to claim 1, wherein the heating results in heat curing the heat-curable coating without damaging the first coating.

19. The method according to claim 1, wherein the heating (a) results in heat curing the heat-curable coating without damaging the first coating, and (b) takes no more than one hour.

20. The method according to claim 1, wherein the heating (a) results in heat curing the heat-curable coating without damaging the first coating, and (b) takes no more than 30 minutes.

21. A method according to claim 1, wherein the heating (a) results in heat curing the heat-curable coating without damaging the first coating, and (b) takes no more than 5 minutes.

22. The method according to claim 1, further comprising:
depositing a second-side sol-gel anti-reflective coating on the heat-curable coating; and
wherein the heating comprises heat curing the second-side anti-reflective coating and the heat-curable coating without damaging the first coating.

23. The method according to claim 22, wherein the heat-curable coating is a hard coating and wherein a ultra-violet (UV) curable primer coating is disposed between the second side and the hard coating.

24. The method according to claim 1, wherein the heat-curable coating is a heat-curable hard coating.

25. The method according to claim 1, wherein the heat-curable coating is a heat-curable anti-reflective coating.

26. The method according to claim 25, wherein the anti-reflective coating is a sol-gel anti-reflective coating that includes at least two layers with different refractive indices.

27. The method according to claim 1, further comprising surfacing the lens to a prescription power.

28. The method according to claim 1, wherein the heating comprises convective heating.

29. The method according to claim 1, wherein the heating comprises intermittently applying heat to the heat-curable coating.

30. The method according to claim 29, wherein the lens is positioned on a circular conveyor belt during the heating and the cooling.

31. The method according to claim 1, wherein the cooling comprises conductive cooling.

32. The method according to claim 31, wherein cooling includes cooling the lens using a liquid.

33. The method according to claim 32, wherein cooling includes cooling the lens using a water-cooled lens holding device.

34. The method according to claim 33, wherein the water-cooled lens holding device includes a curved lens holding surface and a cooling liquid forming a layer between the first side of the lens and the curved lens holding surface.

35. The method according to claim 1, wherein the heating results in heat curing the heat-curable coating without damaging the first coating and cooling includes cooling the lens using a liquid such that the temperature of the first coating does not reach or exceed 50° C. during the heat curing.

36. The method according to claim 35, wherein the heat curing includes heating the heat-curable coating on the second side of the lens to a surface temperature of at least 100° C., preferably 150-170° C.

37. The method according to claim 35, wherein the heat curing includes heating the heat-curable coating on the second side of the lens to a surface temperature of 150-170° C.

38. The method according to claim 1, wherein the cooling comprises convective cooling.

39. The method according to claim 1, wherein the portion of the period of time is less than the period of time.

40. The method according to claim 1, wherein the portion of the period of time is the same as the period of time.

* * * * *